US010457310B2

(12) United States Patent
Sturgeon et al.

(10) Patent No.: US 10,457,310 B2
(45) Date of Patent: Oct. 29, 2019

(54) CONVERTIBLE CARGO CASE

(71) Applicant: RADIO FLYER INC., Chicago, IL (US)

(72) Inventors: Samantha Sturgeon, Chicago, IL (US); Collin Ostergaard, Chicago, IL (US); Anne Goodman, Chicago, IL (US); Garrett DeBry, Chicago, IL (US)

(73) Assignee: Radio Flyer, Inc., Chicago, IL (US)

( * ) Notice: Subject to any disclaimer, the term of this patent is extended or adjusted under 35 U.S.C. 154(b) by 0 days.

(21) Appl. No.: 16/422,015

(22) Filed: May 24, 2019

(65) Prior Publication Data
US 2019/0276063 A1 Sep. 12, 2019

Related U.S. Application Data

(63) Continuation-in-part of application No. 15/982,172, filed on May 17, 2018, now Pat. No. 10,300,933.

(60) Provisional application No. 62/507,345, filed on May 17, 2017.

(51) Int. Cl.
B62B 3/02 (2006.01)
B62B 3/10 (2006.01)
B62B 3/00 (2006.01)

(52) U.S. Cl.
CPC .............. B62B 3/106 (2013.01); B62B 3/007 (2013.01); B62B 3/025 (2013.01); B62B 2205/30 (2013.01)

(58) Field of Classification Search
CPC ........ B62B 2205/04; B62B 2205/0013; B62B 3/027; B62B 3/022
See application file for complete search history.

(56) References Cited

U.S. PATENT DOCUMENTS

| 1,505,182 | A | | 8/1924 | Wrixton |
| 2,558,372 | A | | 6/1951 | Nidermayer, Jr. |
| 2,577,579 | A | | 12/1951 | Hall |
| 2,635,797 | A | | 4/1953 | Siebert |
| 2,693,366 | A | * | 11/1954 | Randolph ................. B62B 7/10 |
| | | | | 16/429 |
| 4,830,238 | A | | 5/1989 | Widinski et al. |
| 5,765,868 | A | | 6/1998 | Ventrone et al. |
| 6,170,854 | B1 | | 1/2001 | Maher et al. |
| 6,491,318 | B1 | | 12/2002 | Galt et al. |
| 7,036,699 | B1 | | 5/2006 | Hay et al. |
| 8,011,686 | B2 | | 9/2011 | Chen et al. |
| 8,220,824 | B2 | | 7/2012 | Chen et al. |
| 8,317,219 | B2 | | 11/2012 | Bruce |
| 8,388,015 | B2 | | 3/2013 | Chen |
| 8,827,282 | B2 | | 9/2014 | Schlegel et al. |

(Continued)

Primary Examiner — Bryan A Evans
(74) Attorney, Agent, or Firm — Barnes and Thornburg LLP

(57) ABSTRACT

A convertible cargo case for a wagon is provided. The cargo case has a housing and a frame. The frame has frame members in a first plane and frame members in a second plane substantially parallel to the first plane. Cross members connect the frame members in the first plane with the frame members in the second plane. The housing has a first side wall, a second side wall, a third side wall, a fourth side wall, and a bottom wall defining a cavity. The housing is releasably secured to the frame with a plurality of locks. The cargo case is positioned adjacent a rear of the wagon in a cargo use configuration, and the wagon is positioned partially within the cavity of the housing in a storage configuration.

20 Claims, 17 Drawing Sheets

(56) References Cited

U.S. PATENT DOCUMENTS

| | | |
|---|---|---|
| 8,973,940 B2 | 3/2015 | Chen et al. |
| 9,033,361 B2 | 5/2015 | Frankel et al. |
| 9,073,564 B2 | 7/2015 | Yang et al. |
| 9,085,311 B1 | 7/2015 | Chen |
| 9,101,206 B1 | 8/2015 | Chen et al. |
| 9,145,154 B1 | 9/2015 | Horowitz |
| 9,211,897 B2 | 12/2015 | Yang et al. |
| D748,739 S | 2/2016 | Horowitz |
| 9,440,668 B1 | 9/2016 | Chen et al. |
| 9,580,095 B2 | 2/2017 | Vargas, II et al. |
| 9,623,890 B1 * | 4/2017 | Horowitz ................ B62B 3/022 |
| 9,771,093 B2 | 9/2017 | Horowitz |
| 9,855,962 B1 | 1/2018 | Chen et al. |
| 9,950,727 B1 | 4/2018 | Pang |
| 9,950,729 B2 | 4/2018 | Choi |
| 10,040,470 B1 | 8/2018 | Horowitz |
| 10,106,186 B2 | 10/2018 | Choi |
| 2005/0275195 A1 | 12/2005 | Matula et al. |
| 2006/0283904 A1 | 12/2006 | Dinslage |
| 2014/0353947 A1 * | 12/2014 | Frankel ................ B62B 3/027 280/651 |
| 2018/0297622 A1 | 10/2018 | Chen et al. |
| 2018/0327011 A1 | 11/2018 | Horowitz et al. |
| 2019/0023300 A1 * | 1/2019 | Fitzwater ................ B62B 3/022 |

\* cited by examiner

CONVERTIBLE CARGO CASE

CROSS-REFERENCE TO RELATED APPLICATIONS

This application is a continuation-in-part of U.S. patent application Ser. No. 15/982,172, filed on May 17, 2018, which issued on May 28, 2019 as U.S. Pat. No. 10,300,933, and which claims the benefit of U.S. Provisional Patent Application No. 62/507,345, filed May 17, 2017, both of which are expressly incorporated herein by reference and made a part hereof.

FEDERALLY SPONSORED RESEARCH OR DEVELOPMENT

Not Applicable.

TECHNICAL FIELD

The present disclosure relates generally to cargo cases, and more specifically to a removable and convertible cargo case that is connectable to a wagon, and which can also function as an enclosure for the wagon when the wagon is in the folded configuration.

BACKGROUND

Cargo cases are well known in the art. Similarly, wagons, including folding wagons, are well known in the art. While such cargo cases for wagons, and preferably for folding wagons, according to the prior art provide a number of advantages, they nevertheless have certain limitations. The present disclosure seeks to overcome certain of these limitations and other drawbacks of the prior art, and to provide new features not heretofore available. A full discussion of the features and advantages of the present disclosure is deferred to the following detailed description, which proceeds with reference to the accompanying drawings.

SUMMARY

According to one embodiment, the disclosed subject technology relates to a convertible cargo case for a wagon. The convertible cargo case is preferably convertible between three configurations: an open cargo or cargo configuration when connected to the wagon, a cargo use configuration when removed from the wagon, and a wagon storage configuration.

The disclosed technology further relates to a convertible cargo case for a wagon having a plurality of hangers extending therefrom, comprising: a frame having a first vertical member in a first plane, a second vertical member in the first plane and spaced a distance from the first vertical member, a third vertical member in a second plane different from the first plane, a fourth vertical member in the second plane and spaced a distance from the third vertical member, a first cross member connecting a first end of the third vertical member with a first end of the fourth vertical member, the first cross member being in the second plane, a second cross member connecting a second end of the first vertical member with a second end of the third vertical member, the second cross member being substantially perpendicular to the first plane and the second plane, and a third cross member connecting a second end of the second vertical member with a second end of the fourth vertical member, the third cross member being substantially perpendicular to the first plane and the second plane; a first receiver adjacent a first end of the first vertical member for releasably engaging one of the plurality of hangars of the wagon to assist in securing the cargo case to the wagon in a cargo use position; a second receiver adjacent a first end of the second vertical member for releasably engaging another of the plurality of hangars of the wagon to assist in securing the cargo case to the wagon in a cargo use position; and, a housing having a first side wall, a second side wall opposing the first side wall, a third side wall joining one end of the first side wall and one end of the second side wall, a fourth side wall opposing the third side wall and joining an opposing end of the first side wall and an opposing end of the second side wall, and a bottom wall joining a bottom end of the first side wall, second side wall, third side wall and fourth side wall to define a cavity of the housing, the housing having a rigid member at the bottom wall, and the bottom wall and the rigid member each having an opening to allow a hand grip of the wagon to pass therethrough; and, a lock to releasably secure the housing to the frame.

The disclosed technology further relates to a convertible cargo case for a wagon having at least one hanger extending therefrom, comprising: a frame having a plurality of frame members in a first plane, a plurality of frame members in a second plane, the second plane being substantially parallel to the first plane, and a plurality of cross members connecting the plurality of frame members in the first plane with the plurality of frame members in the second plane; a receiver extending from one of the plurality of frame members in the first plane for releasably engaging the at least one hanger of the wagon; and, a housing having a first side wall, a second side wall opposing the first side wall, a third side wall joining one end of the first side wall and one end of the second side wall, a fourth side wall opposing the third side wall and joining an opposing end of the first side wall and an opposing end of the second side wall, and a bottom wall joining a bottom end of the first side wall, second side wall, third side wall and fourth side wall to define a cavity of the housing, wherein the first side wall of the housing has a first pocket to receive at least one of the plurality of frame members in the first plane, wherein the second side wall of the housing has a second pocket to receive at least one of the plurality of frame members in the second plane, wherein the housing is releasably secured to the frame of the convertible cargo case, wherein the convertible cargo case is positioned adjacent a rear of the wagon in a cargo use configuration, and wherein the wagon is positioned partially within the cavity of the housing in a storage configuration.

The disclosed technology further relates to a convertible cargo case for a wagon having a plurality of hangers extending therefrom, comprising: a frame having a plurality of frame members in a first plane, a plurality of frame members in a second plane, the second plane being substantially parallel to the first plane, and a plurality of cross members connecting the plurality of frame members in the first plane with the plurality of frame members in the second plane; and, a housing having a first side wall, a second side wall opposing the first side wall, a third side wall joining one end of the first side wall and one end of the second side wall, a fourth side wall opposing the third side wall and joining an opposing end of the first side wall and an opposing end of the second side wall, and a bottom wall joining a bottom end of the first side wall, second side wall, third side wall and fourth side wall to define a cavity of the housing, wherein the first side wall of the housing has a first pocket to receive at least one of the plurality of frame members in the first plane, wherein the second side wall of the housing has a second pocket to receive at least one of the plurality of frame members in the second plane, wherein the housing is releasably secured to the frame of the convertible cargo case with a plurality of locks, wherein the housing has a rigid member at the bottom wall, and the bottom wall and the rigid member each have an opening to allow a hand grip of the wagon to pass therethrough, wherein the convertible cargo case is positioned adjacent a rear of the wagon in a cargo use configuration, and wherein the wagon is positioned partially within the cavity of the housing in a storage configuration.

The disclosed technology further relates to a convertible cargo case having a rigid pivotable bottom member to selectively cover the opening in the bottom wall and in the rigid member.

The disclosed technology further relates to a convertible cargo case wherein the first side wall of the housing has a first pocket to receive at least one of the first vertical frame member and the second vertical frame member. In another embodiment, the second side wall of the housing has a second pocket to receive the first cross member, third vertical member and fourth vertical member.

The disclosed technology further relates to a convertible cargo case having a first handle connected to the first side wall and a second handle connected to the second side wall.

The disclosed technology further relates to a convertible cargo case wherein the lock comprises a first lock to secure the second cross member to the housing and a second lock to secure the third cross member to the housing.

The disclosed technology further relates to a convertible cargo case wherein the convertible cargo case is positioned adjacent a rear of the wagon in a cargo use configuration, and wherein the wagon is positioned partially within the cavity of the housing in a storage configuration.

The disclosed technology further relates to a convertible cargo case wherein the first receiver and second receiver have openings to each receive one of the plurality of hangers extending from the wagon.

The disclosed technology further relates to a convertible cargo case having a securing member on the first side wall of the housing to retain a handle of the wagon in a storage configuration.

The disclosed technology further relates to a convertible cargo case wherein the plurality of frame members in the first plane comprise a first vertical member and a second vertical member spaced a distance from the first vertical member, wherein the plurality of frame members in the second plane comprise a third vertical member, a fourth vertical member spaced a distance from the third vertical member, and a first cross member connecting a first end of the third vertical member with a first end of the fourth vertical member, wherein the plurality of a cross members connecting the plurality of frame members in the first plane with the plurality of frame members in the second plane comprises a second cross member connecting a second end of the first vertical member with a second end of the third vertical member and a third cross member connecting a second end of the second vertical member with a second end of the fourth vertical member.

The disclosed technology further relates to a convertible cargo case wherein the second cross member is substantially perpendicular to the first plane and the second plane, and wherein the third cross member is substantially perpendicular to the first plane and the second plane.

The disclosed technology further relates to a convertible cargo case wherein the housing has a rigid member connected to the bottom wall, and the bottom wall and the rigid member each having an opening to allow a hand grip of the wagon to pass therethrough.

The disclosed technology further relates to a convertible cargo case having a rigid pivotable bottom member to selectively cover the opening in the bottom wall.

The disclosed technology further relates to a convertible cargo wherein the housing has openings to allow the plurality of hangers extending from the wagon to extend therethrough.

The disclosed technology further relates to a convertible cargo case wherein the receiver of the frame comprises a first receiver extending from one of the plurality of frame members in the first plane for releasably engaging a first of the at least one of the hangers of the wagon, and a second receiver extending from another one of the plurality of frame members in the first plane for releasably engaging a second of the at least one of the of hangers of the wagon.

The disclosed technology further relates to a convertible cargo case having a lock to releasably secure the housing to the frame.

According to another embodiment, the disclosed subject technology relates to a convertible cargo case for a wagon. The convertible cargo case is preferably convertible between three configurations: an open cargo configuration, a closed cargo configuration, and a wagon storage configuration.

The disclosed subject technology further relates to a convertible cargo case where The disclosed technology further relates to a convertible cargo case for a wagon, comprising: a housing comprising a first side wall; a second side wall opposing the first side wall; a third side wall joining one end of the first side wall and one end of the second side wall; a fourth side wall opposing the third side wall and joining an opposing end of the first side wall and an opposing end of the second side wall; and, a bottom wall joining a bottom end of the first side wall, second side wall, third side wall and fourth side wall to define a cavity of the housing; a rigid member at the bottom wall, the bottom wall having an opening therethrough; a connector extending from the cavity, the connector having a pocket for removably securing the housing to the wagon; wherein the housing is convertible between three configurations, an open cargo configuration, a closed cargo configuration, and a wagon storage configuration, and wherein the pocket is removably secured to the wagon in each configuration; and, a securing member connected to one of the second side wall and the connector, the securing member adapted to be secured to a bottom of the housing when the cargo case is in the closed cargo configuration.

The disclosed technology further relates to a convertible cargo case for a wagon, comprising: a housing comprising a first side wall; a second side wall opposing the first side wall; a third side wall joining one end of the first side wall and one end of the second side wall; a fourth side wall opposing the third side wall and joining an opposing end of the first side wall and an opposing end of the second side wall; and, a bottom wall joining a bottom end of the first side wall, second side wall, third side wall and fourth side wall to define a cavity of the housing; and, a connector extending from the cavity, the connector having a receiver for removably securing the housing to the wagon, wherein the housing is convertible between three configurations, an open cargo configuration, a closed cargo configuration, and a wagon storage configuration, and wherein the connector is secured to the wagon in each configuration.

The disclosed technology further relates to a convertible cargo case for a wagon, comprising: a housing comprising a first side wall; a second side wall opposing the first side wall; a third side wall joining one end of the first side wall and one end of the second side wall; a fourth side wall opposing the third side wall and joining an opposing end of the first side wall and an opposing end of the second side wall; and, a bottom wall joining a bottom end of the first side wall, second side wall, third side wall and fourth side wall to define a cavity of the housing; and, a connector extending from the cavity, the connector having a receiver for removably securing the housing to the wagon, wherein the housing is convertible between three configurations, an open cargo configuration, a closed cargo configuration, and a wagon storage configuration, wherein the connector is secured to the wagon in each configuration, and wherein the housing is positioned adjacent a rear of the wagon in the open cargo configuration and closed cargo configuration, and wherein the wagon is positioned partially within the cavity of the housing in the wagon storage configuration.

The disclosed technology further relates to a convertible cargo case wherein the bottom wall has a rigid portion, and wherein the rigid portion of the bottom wall has an opening therethrough. In one embodiment the convertible cargo case further has a rigid pivotable bottom member to selectively cover the opening in the bottom wall.

The disclosed technology further relates to a convertible cargo wherein the first side wall has a first rigid portion and a second rigid portion, and a fold area between the first rigid portion and the second rigid portion.

The disclosed technology further relates to a convertible cargo case wherein the first side wall has a rigid portion thereto, wherein the second side wall has a rigid portion thereto, and wherein the third side wall and fourth side wall have a flexible portion thereto to allow the housing to collapse in the closed cargo configuration.

The disclosed technology further relates to a convertible cargo case wherein the housing is positioned adjacent a rear of the wagon in the open cargo configuration and closed cargo configuration, and wherein the wagon is positioned partially within the cavity of the housing in the wagon storage configuration.

The disclosed technology further relates to a convertible cargo case wherein the connector has a pocket that extends partially over a rear wall of the wagon. In one embodiment, the pocket has cutouts to allow a portion of the wagon to pass through the pocket.

The disclosed technology further relates to a convertible cargo case wherein the connector extends from the one of the second side wall of the housing and the bottom wall of the housing.

The disclosed technology further relates to a convertible cargo case further comprising a securing member connected to one of the second side wall and the connector, the securing member adapted to be secured to a bottom of the housing to retain the housing in the closed cargo configuration.

It is understood that other configurations and embodiments of the subject technology will become readily apparent to those skilled in the art from the following detailed description, wherein various configurations of the subject technology are shown and described by way of illustration. As will be realized, the subject technology is capable of other and different configurations, and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

To understand the present disclosure, it will now be described by way of example, with reference to the accompanying drawings in which embodiments of the disclosures are illustrated and, together with the descriptions below, serve to explain the principles of the disclosure.

Figure 1:
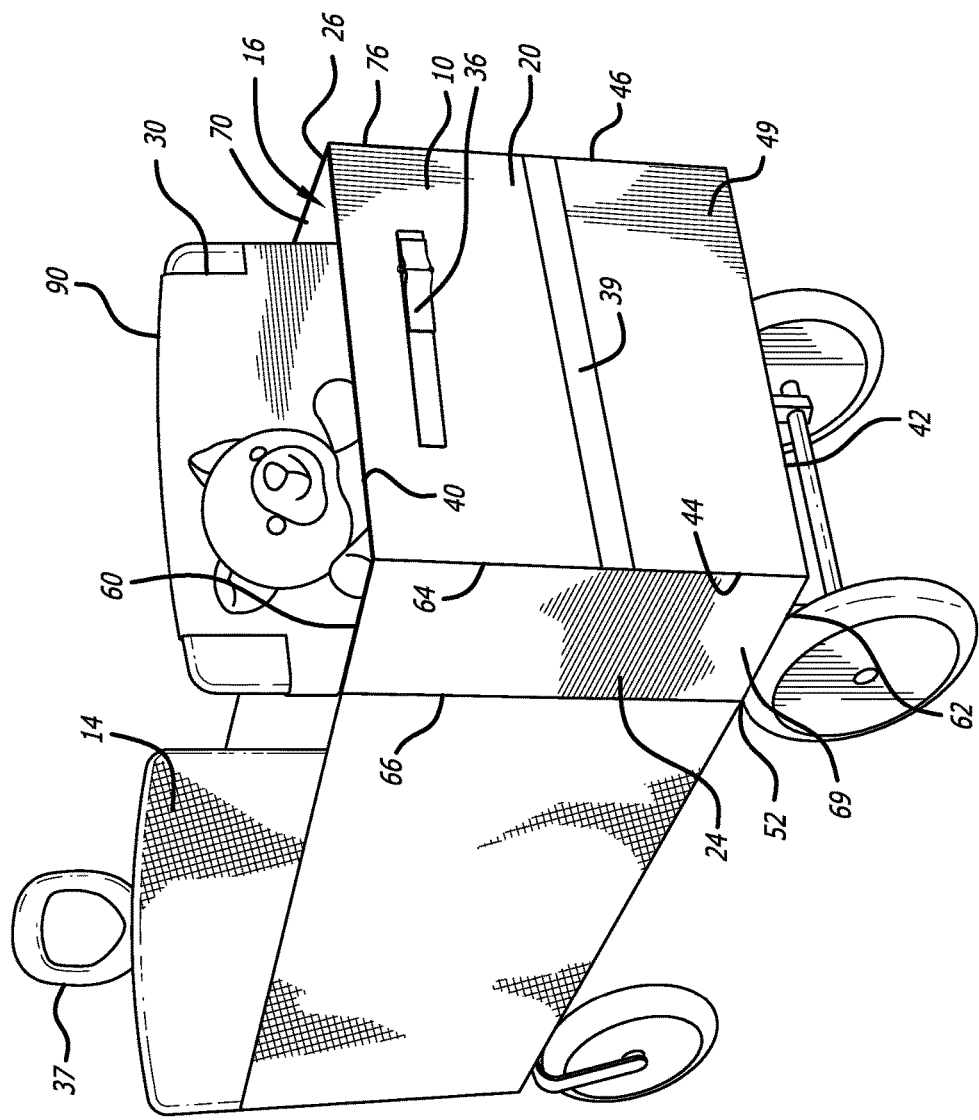
FIG. 1 is a front perspective view of a convertible cargo case according to one embodiment, showing the convertible cargo case in the cargo use position and connected to a foldable wagon in an unfolded or use configuration.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

While the convertible cargo case discussed herein is susceptible of embodiments in many different forms, there is shown in the drawings, and will herein be described in detail, preferred embodiments with the understanding that the present description is to be considered as an exemplification of the principles of the foldable wagon and are not intended to limit the broad aspects of the disclosure to the embodiments illustrated.

Figure 8:
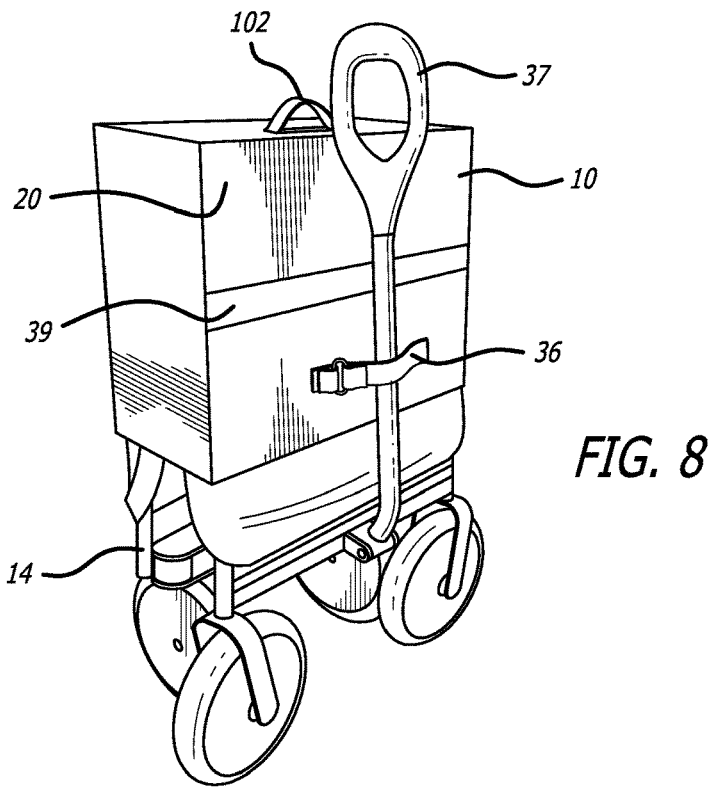
FIG. 8 is a rear perspective view of the convertible cargo case in the case use position on a foldable wagon.
Figure 9:
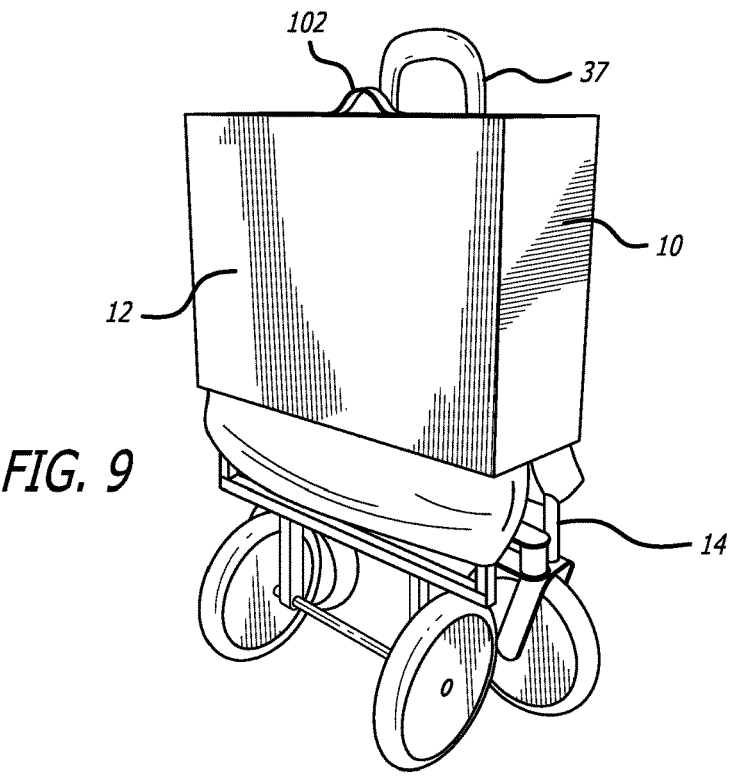
FIG. 9 is a front perspective view of the convertible cargo case in the case use position on a foldable wagon.

Referring now to the figures, in one embodiment a convertible cargo case 10 is shown and comprises a housing 12 that is convertible between two modes, a cargo mode and a case mode, and three configurations/positions: an unfolded or cargo-use configuration/position (FIGS. 1 and 2), a collapsed or cargo-folded configuration/position (FIGS. 3 and 4), and a storage or case-use configuration/position (FIGS. 8 and 9). In a preferred embodiment the cargo case 10 is removably connected to a ride-on product, such as a wagon 14, which may include a foldable wagon 14 as illustrated in the figures. The foldable wagon 14 may be able to transition from an open position as shown in FIG. 1, to a closed or folded position as shown in FIGS. 8 and 9. The cargo case 10 is adapted to provide a retaining cavity 16 for holding items in the use position as shown in FIG. 1, and when not holding items it is adapted to be folded into the folded position as shown in FIG. 3. Additionally, if connected to a wagon 14 or other ride-on product that is able to fold for storage, when the wagon 14, for example, is transitioned to the folded position the cargo case 10 is adapted to be transitioned to a storage/transportation case as shown in FIGS. 8 and 9 for retaining the wagon 14 in the cavity 16 for storage and/or transportation of the wagon 14 in its folded orientation. In a preferred embodiment, the cargo case 10 is preferably made of a non-rigid material, such as fabric, however, in alternate embodiments it may also have rigid components thereto for strength and stability.

Figure 4:
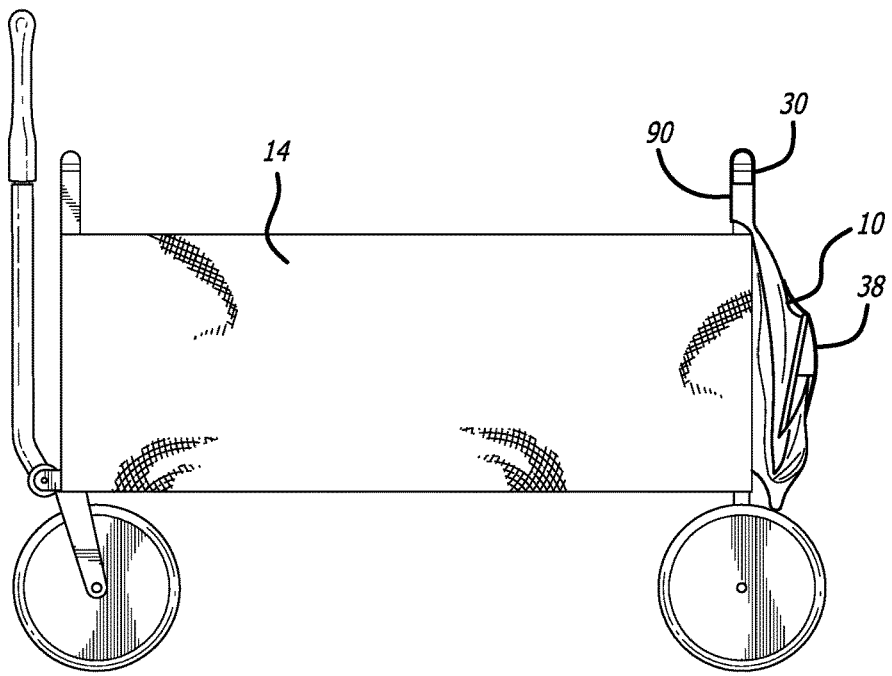
FIG. 4 is a side perspective view of the convertible cargo case of FIG. 3 in the folded configuration.
Figure 5:
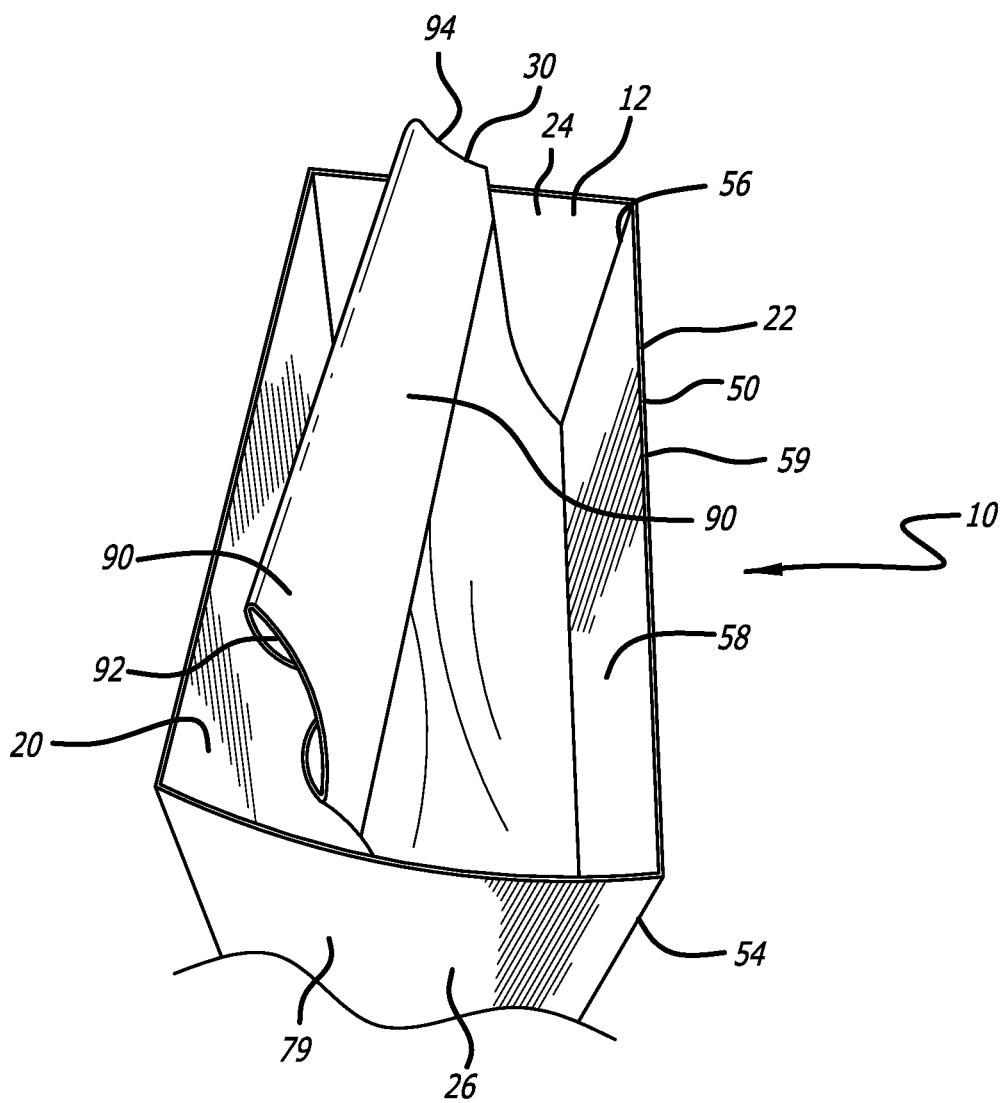
FIG. 5 is a top perspective view of the convertible cargo case of FIG. 1 removed from the foldable wagon.
Figure 6:
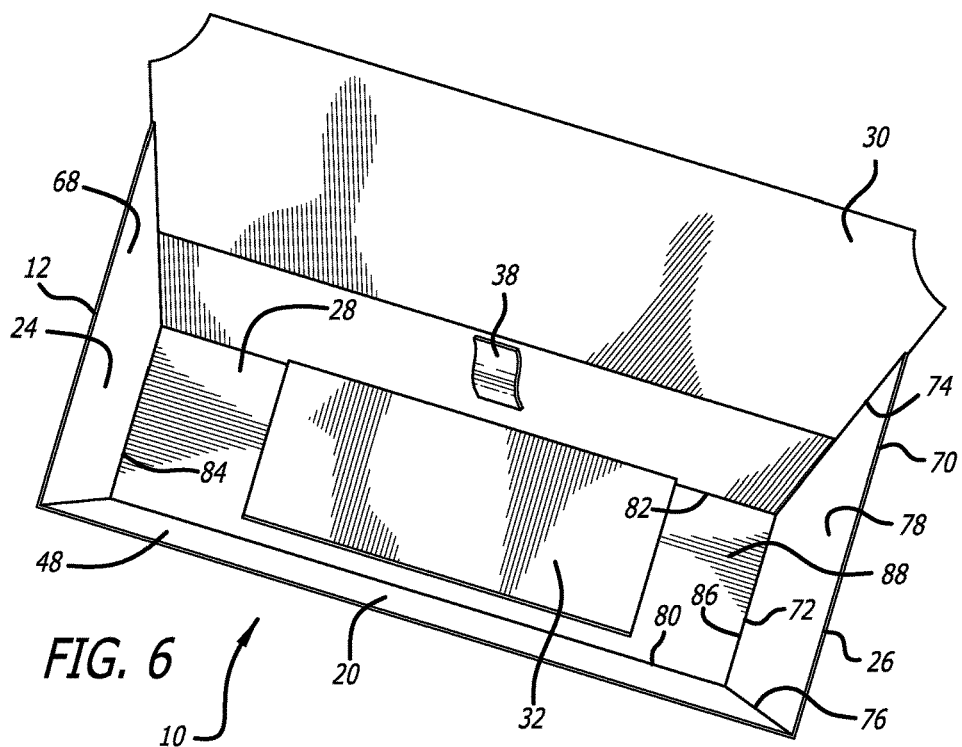
FIG. 6 is a top perspective view of the convertible cargo case of FIG. 1 in the use configuration.
Figure 7:
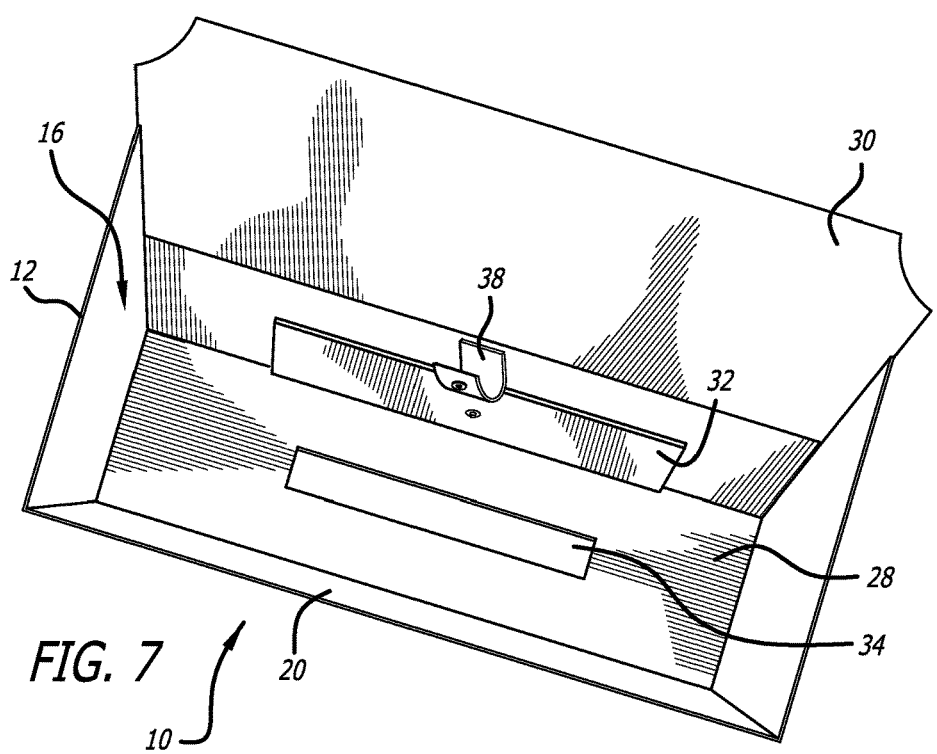
FIG. 7 is a top perspective view of the convertible cargo case of FIG. 1 in the use position prior to transition to the folded configuration.

As shown in FIGS. 5-7, the housing 12 of the cargo case 10 may comprise a first side wall 20, an opposing second side wall 22, a third side wall 24 extending between and preferably connecting the first side wall 20 and the second side wall 22, and a fourth side wall 26 that opposes the third side wall 24 and which extends between and preferably connects the first side wall 20 and the second side wall 22. The housing 12 may also comprise a bottom wall 28 that connects the first side wall 20, second side wall 22, third side wall 24 and fourth side wall 26. Additionally, in a preferred embodiment, the cargo case 10 also comprises a connector 30 that removably secures the cargo case 10 to the wagon 14 or other ride-on. In one embodiment the connector 30 extends from within the cavity 16 of the housing 12 and can be secured to the wagon 14 to secure the cargo case 10 in the use and folded cargo positions (FIGS. 1-4) as well as in the case position (FIGS. 8 and 9). In one embodiment the connector 30 extends from the joint between the second side wall 22 and the bottom wall 28. Alternately, the connector 30 may extend from the second side wall 22. Additional embodiments are also possible.

The cargo case 10 may also comprise a bottom member 32, as shown in FIGS. 6 and 7 that operates to both cover an opening 34 in the bottom wall 28, and which, in certain embodiments, operates as a rigid member for the housing 12 of the cargo case 10. In one embodiment the bottom member 32 extends from the joint between the second side wall 22 and the bottom wall 28. Additionally, the cargo case 10 may have first securing member 36 to secure a handle 37 of the wagon 14 to the cargo case 10 in the case use position as shown in FIG. 8, and a second securing member 38 to secure the housing 12 in the folded configuration as shown in FIG. 3.

Figure 3:
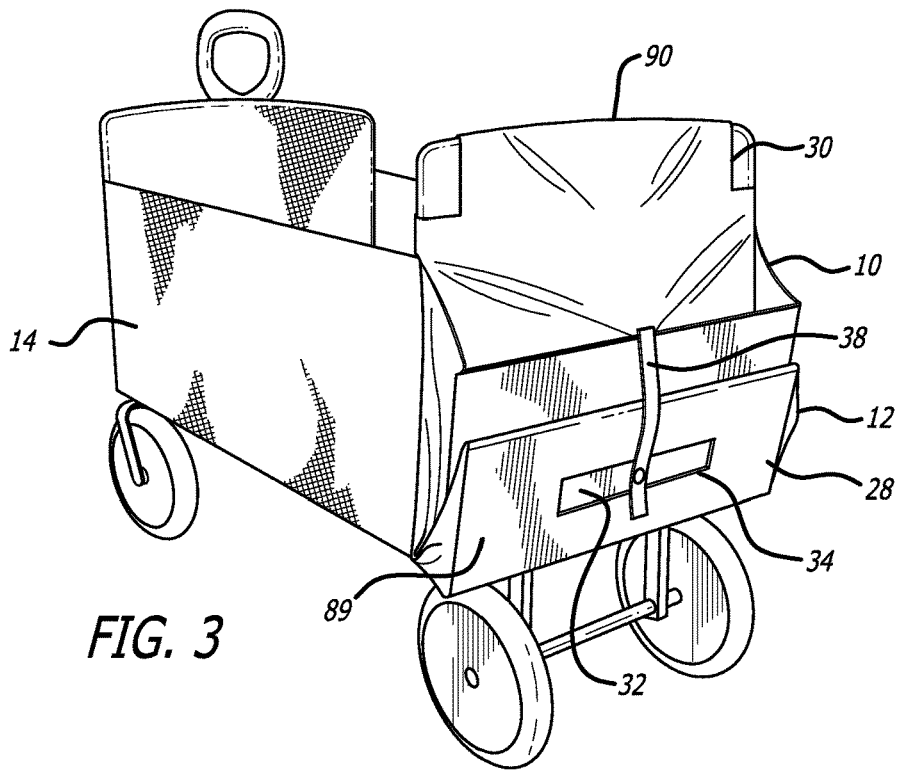
FIG. 3 is a front perspective view of the convertible cargo case of FIG. 1 connected to the foldable wagon with the convertible cargo case in the folded configuration.

In one embodiment various side walls of the housing 12 may have rigid members therein, or they may be made of rigid components as opposed to or in addition to a flexible fabric, to provide support and structure to the cargo case 10. For example, in one embodiment the second side wall 22 has a rigid member therein. Similarly, in one embodiment the bottom wall 28 has a rigid member therein. Finally, in one embodiment the first side wall 20 has a rigid member therein, however, the rigid member in the first side wall 20 may be made of multiple parts with a fold area 39 between the multiple parts to allow the first side wall 20 to fold in the collapsed or cargo-folded configuration/position as shown in FIGS. 3 and 4.

Referring to FIGS. 1, 5 and 6, in one embodiment the first side wall 20 has a first or top end 40, a second or bottom end 42, a first side edge 44, a second side edge 46, an interior surface 48 and an exterior surface 49. Similarly, the second side wall 22 has a first or top end 50, a second or bottom end 52, a first side edge 54, a second side edge 56, an interior surface 58 and an exterior surface 59. The third side wall 24 has a first or top end 60, a second or bottom end 62, a first side edge 64, a second side edge 66, an interior surface 68 and an exterior surface 69. The fourth side wall 26 has a first or top end 70, a second or bottom end 72, a first side edge 74, a second side edge 76, an interior surface 78 and an exterior surface 79. Finally, the bottom wall 28 has a first edge 80, a second edge 82, a third edge 84, a fourth edge 86, an interior surface 88 and an exterior surface 89. In one embodiment the interior surfaces of the first side wall 20, second side wall 22, third side wall 24, fourth side wall 26 and bottom wall 28 define the cavity 16 of the housing 12.

In one embodiment, the construction of the housing 12 of the cargo case 10 is as follows. The first side edge 64 of the third side wall 24 is connected to the first side edge 44 of the first side wall 20; the second side edge 66 of the third side wall 24 is connected to the second side edge 56 of the second side wall 22; and the bottom end 62 of the third side wall 24 is connected to the third edge 84 of the bottom wall 28. The first side edge 74 of the fourth side wall 26 is connected to the first side edge 54 of the second side wall 22; the second side edge 76 of the fourth side wall 26 is connected to the second side edge 46 of the first side wall 20; and the bottom end 72 of the fourth side wall 26 is connected to the fourth edge 86 of the bottom wall 28. Finally, the bottom end 42 of the first side wall 20 is connected to the first edge 80 of the bottom wall 28, and the bottom end 52 of the second side wall 22 is connected to the second edge 82 of the bottom wall 28. Accordingly, as explained above, in this configuration the interior surfaces 48, 58, 68, 78 and 88 of the first side wall 20, second side wall 22, third side wall 24, fourth side wall 26 and bottom wall 28, respectively, define the interior cavity 16 of the housing 12.

Referring to FIG. 5, in one embodiment, the connector 30 extends from the interior cavity 16 of the housing 12. As shown in FIG. 7, in a preferred embodiment the connector 30 is secured to the interior surface 58 of the second side wall 22. In a preferred embodiment the connector 30 is a flexible member, which, for example, may be made of a flexible fabric or other material, that has a receiver 90 for securing the connector 30 to the wagon 14 or other external component. Additionally, in one embodiment the connector 30 has cutouts 92 and 94 to provide relief areas for the wagon frame that is secured within the receiver 90. In a preferred embodiment, the connector 30 is a pocket that is secured at least partially around a rear wall or rear frame of a wagon 14.

Referring to FIGS. 7-9, the bottom wall 28 may have an aperture 34 that extends through the bottom wall 28 from the interior surface 88 thereof to the exterior surface 89 thereof. The aperture 34 is provided to allow a handle or hand grip 102 of the wagon 14 to extend through the housing 12 for carrying the cargo case 10 and wagon 14 together. In one embodiment the hand grip 102 extends from a bottom wall of the wagon 14.

Referring to FIGS. 3, 6 and 7, the cargo case 10 also includes a second securing member 38 for securing the cargo case 10 in the collapsed or cargo-folded configuration/position as shown in FIGS. 3 and 4. In one embodiment the second securing member 38 is secured to the interior surface 58 of the second side wall 22. Further, a receiver 12 may be secured to the bottom wall 28 or to the bottom member 32, which may be accessible through the aperture 34 in the bottom wall 28, for connecting the free end of the second securing member 38.

Figure 2:
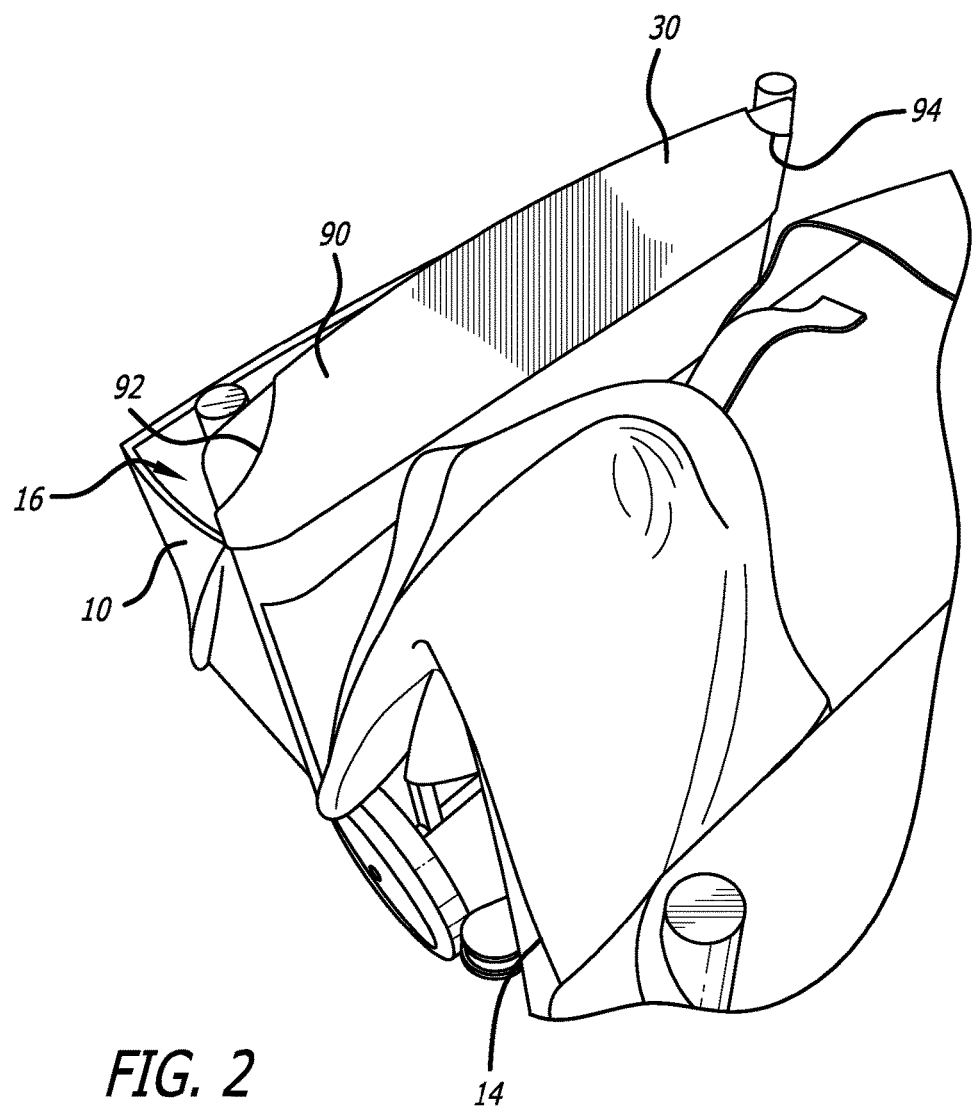
FIG. 2 is a rear perspective view of the convertible cargo case of FIG. 1, with the foldable wagon moving to a folded configuration.

Accordingly, the cargo case 10 is useable in a cargo carrying mode as shown in FIGS. 1 and 2, with cargo able to be retained in the cavity 16 of the housing 12. When no cargo is required to be retained in the cavity 16 of the housing 12, the cargo case 10 may be folded as shown in FIGS. 3 and 4 and secured in the folded position with the second securing member 38. Finally, when the user desires to fold the wagon 14 or other ride-on for transportation or storage, the cargo case 10 may be converted into a case in the case mode. To place the cargo case 10 in the case mode, the housing 12 is rotated on top of the folded wagon 14 and the folded wagon 14 is partially placed into the cavity 16 of the housing 12. Additionally, if it is desired to have a handle 102 of the wagon 14 extend through the aperture 34 in the bottom wall 28 of the housing 12 for carrying the wagon 14 and cargo case 10 together, it is preferred that the bottom member 32 within the cavity 16 of the housing 12 be moved and/or secured to the interior surface 58 of the second side wall 22 prior to placing the wagon 14 in the cavity 16 of the housing 12.

Figure 10:
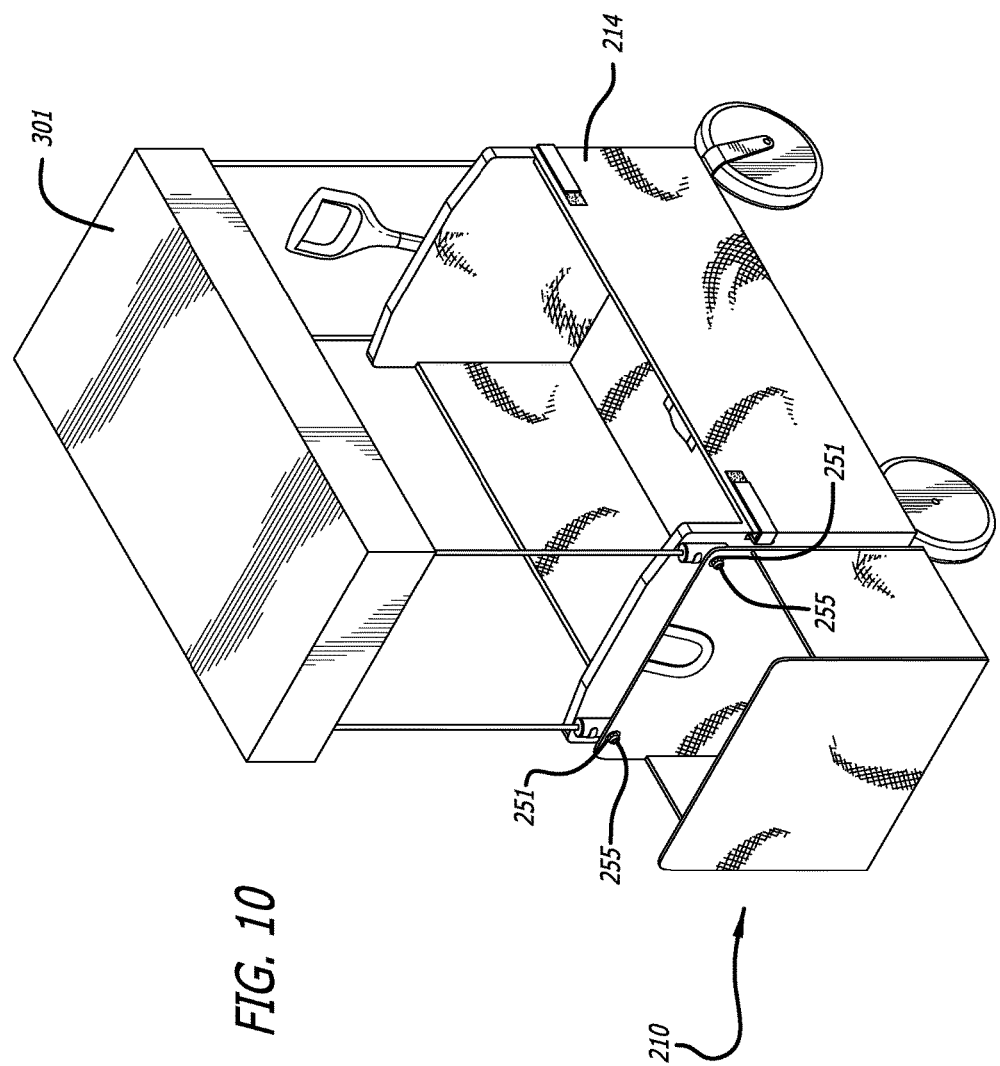
FIG. 10 is a front perspective view of a convertible cargo case according to another embodiment, showing the convertible cargo case in the cargo use position and connected to a foldable wagon in an unfolded or use configuration.
Figure 11:
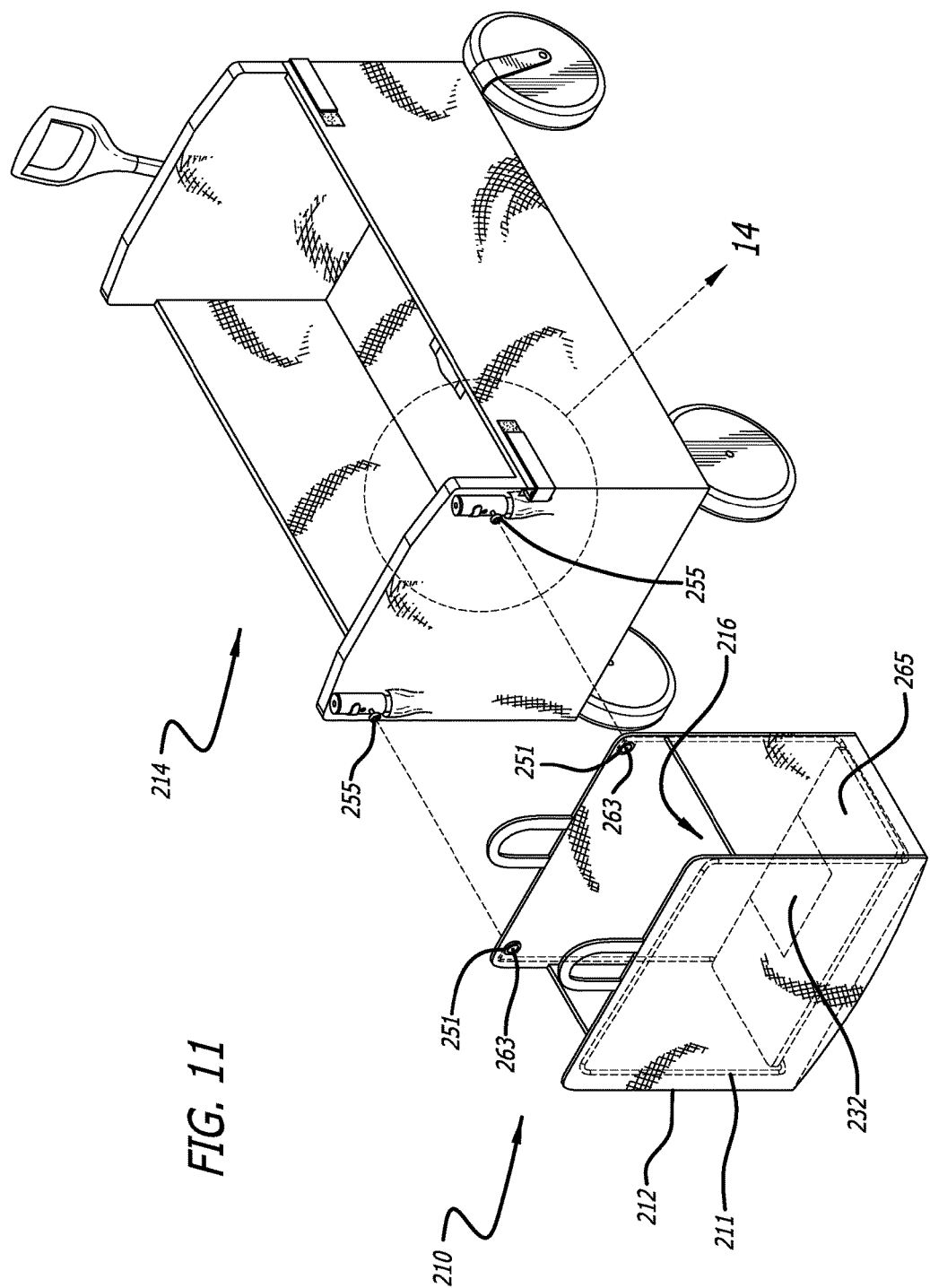
FIG. 11 is a front perspective view of the convertible cargo case of FIG. 10 removed from the wagon, with the cargo case still in the cargo use position.
Figure 12:
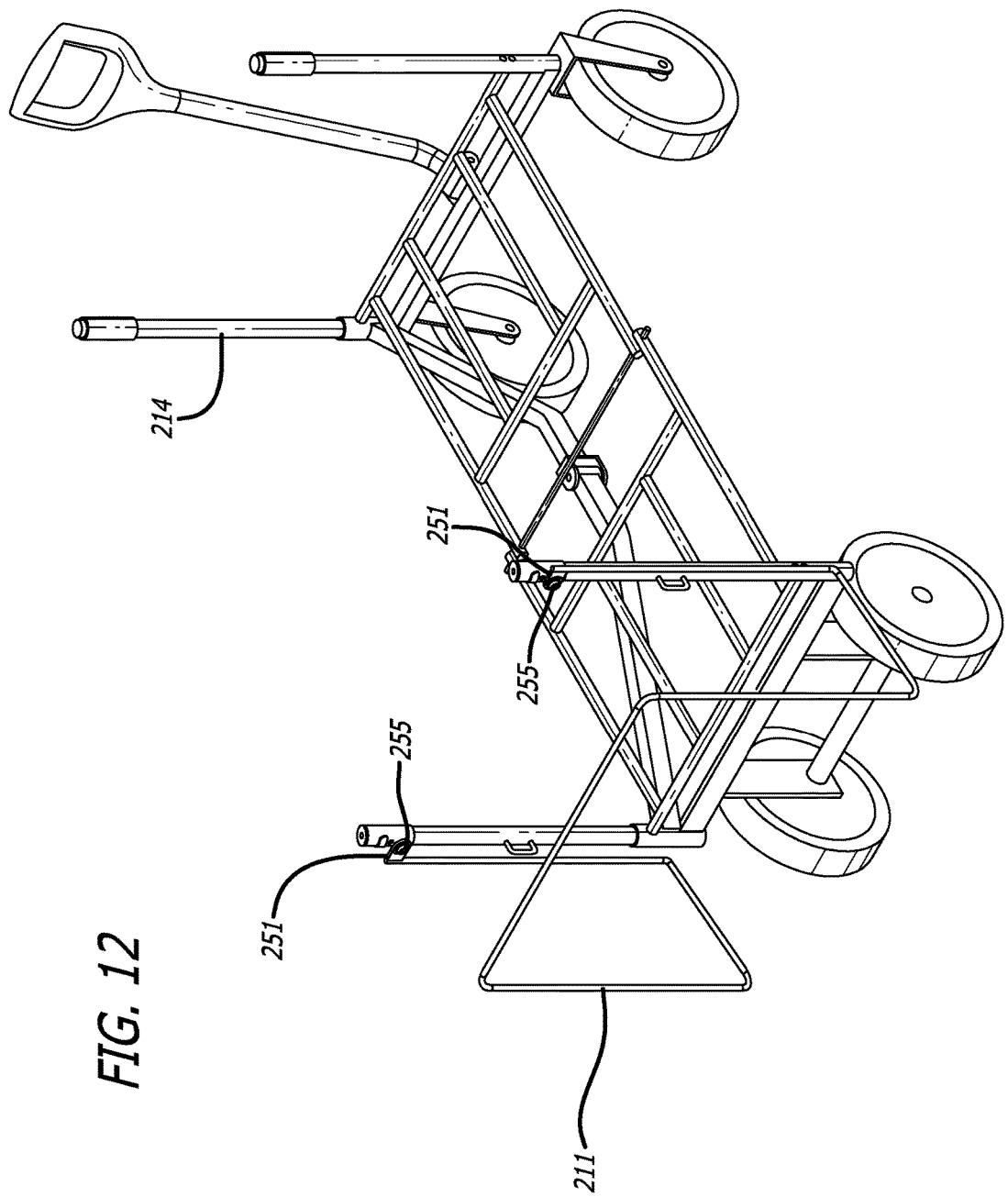
FIG. 12 is a front perspective view of one embodiment of a frame for a convertible cargo case, connected to one embodiment of a frame for a wagon.
Figure 18:
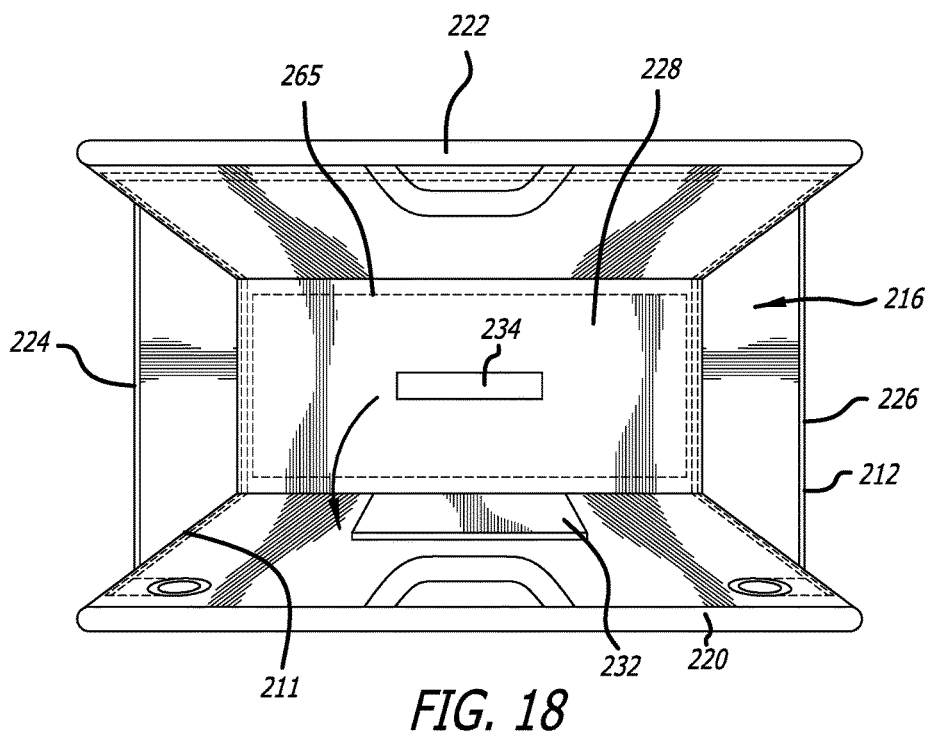
FIG. 18 is a top view of the convertible cargo case of FIG. 10 with a bottom member transitioned to a storage use position.
Figure 19:
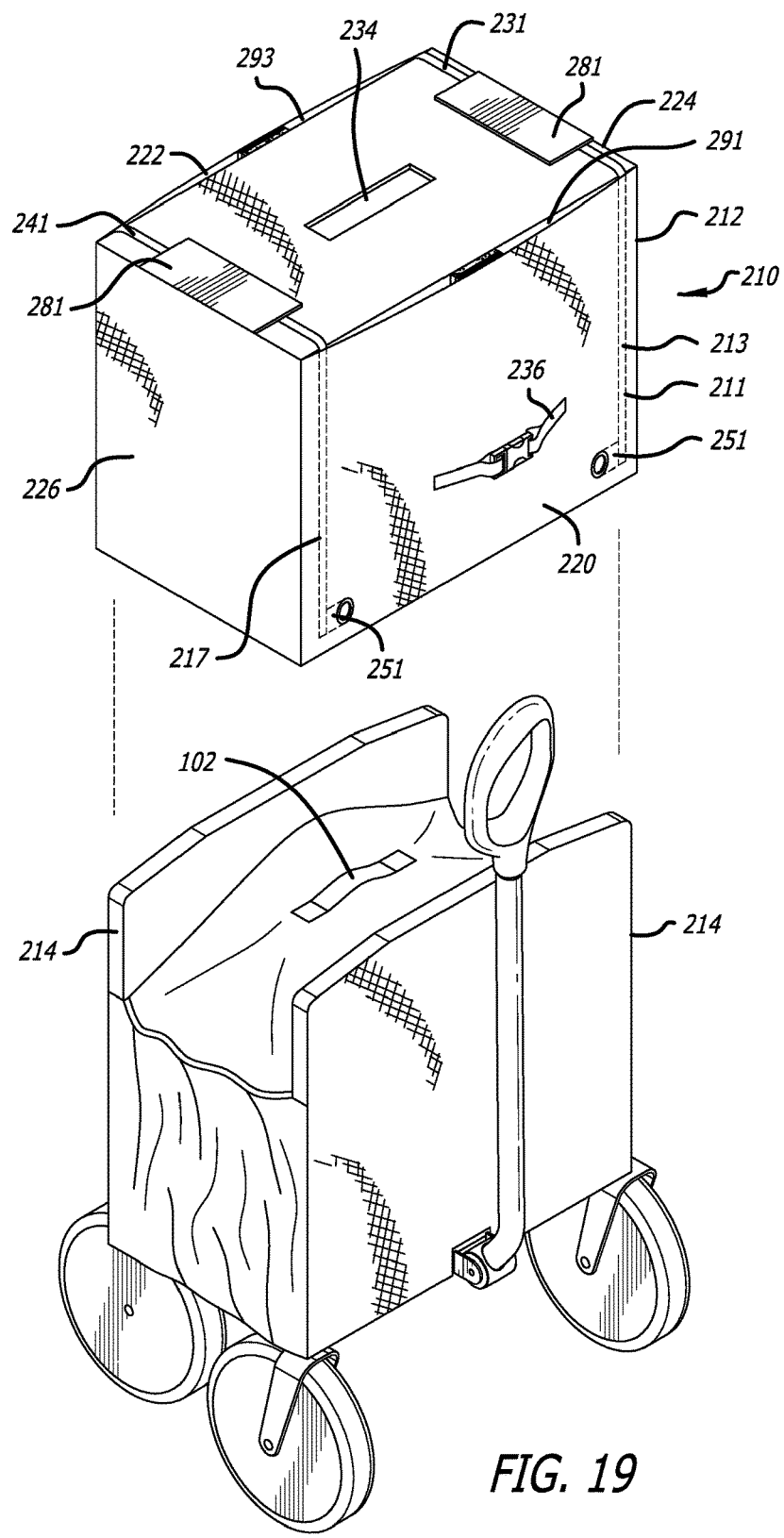
FIG. 19 is a rear perspective view of the wagon of FIG. 10 in the folded position, and the cargo case positioned to be transitioned to the storage position.
Figure 20:
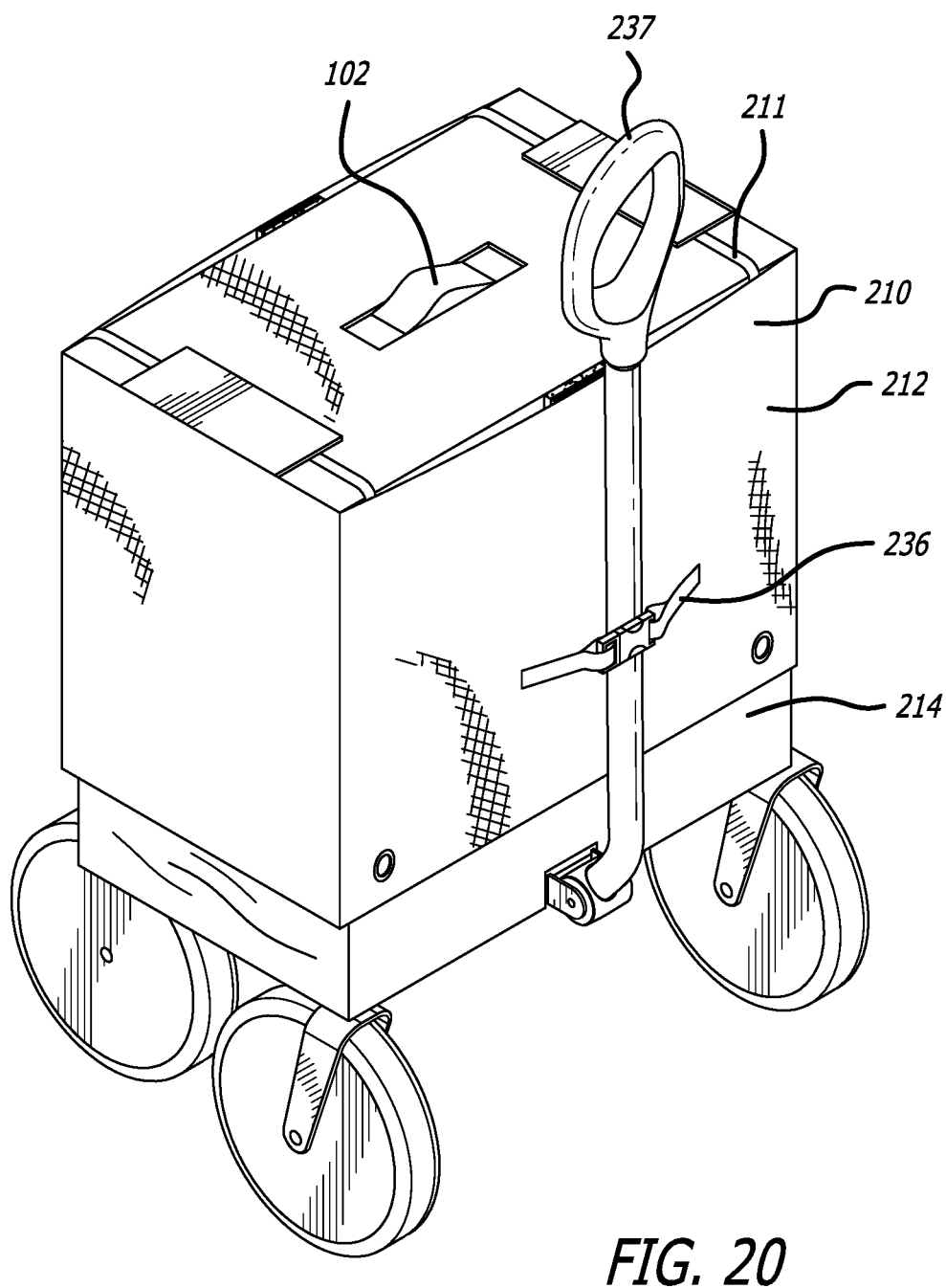
FIG. 20 is a rear perspective view of the convertible cargo case in the storage position on a foldable wagon.
Figure 21:
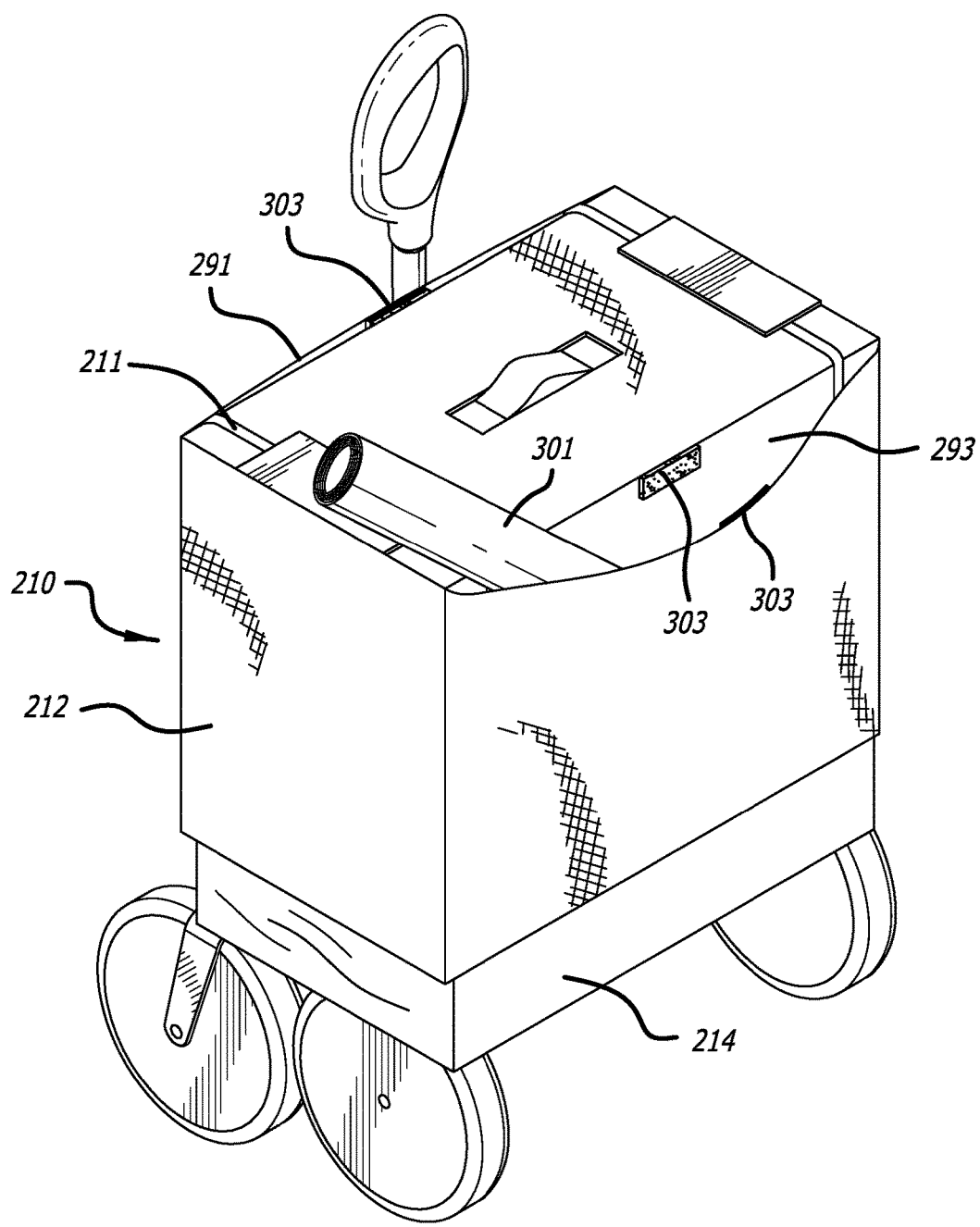
FIG. 21 is a front perspective view of the convertible cargo case in the storage position on a foldable wagon, and a canopy for the wagon stored in a pocket of the convertible cargo case.

Referring now to the figures, in another embodiment a convertible cargo case 210 is shown that is convertible between two modes, a cargo mode and a case mode, and three configurations/positions: an unfolded or cargo-use configuration/position connected to the wagon 214 (FIG. 10), a cargo-use configuration removed from the wagon 214 (FIGS. 11, 17 and 18), and a storage or case-use configuration/position (FIGS. 19-21). In a preferred embodiment the cargo case 210 is removably connected to a ride-on product, such as the wagon 214, which may include a foldable wagon 214 as illustrated in the figures. The foldable wagon 214 may be able to transition from an open position as shown in FIGS. 10-12, to a closed or folded position as shown in FIGS. 19-21. The cargo case 210 is adapted to provide a retaining cavity 216 for holding items in the use position as shown in FIGS. 10 and 11. Additionally, if connected to a wagon 214 or other ride-on product that is able to fold for storage, when the wagon 214, for example, is transitioned to the folded position the cargo case 210 is adapted to be transitioned to a storage/transportation case as shown in FIGS. 19-21 for retaining the wagon 214 in the cavity 216 for storage and/or transportation of the wagon 214 in its folded orientation. In a preferred embodiment, the cargo case 210 is preferably made of a frame 211 and a housing 212. In one embodiment the frame 211 is a bent-up rigid component, such as a bent metal rod, and the housing is made of a non-rigid material, such as fabric, however, in alternate embodiments different materials may be used to provide similar strength and stability.

As shown in FIGS. 12 and 13, in one embodiment the frame 211 of the cargo case 210 may comprise a first vertical member 213 in a first plane and a second vertical member 217 in the first plane and spaced a distance from the first vertical member 213. The frame 211 may also comprise a third vertical member 219 in a second plane different from the first plane, and a fourth vertical member 223 in the second plane and spaced a distance from the third vertical member 219. The frame 211 may also have a first cross member 225 connect a first end 227 of the third vertical member 219 with a first end 229 of the fourth vertical member 223. Accordingly, the first cross member 225 is preferably located in the second plane. Additionally, in one embodiment, a second cross member 231 may connect a second end 233 of the first vertical member 213 with a second end 235 of the third vertical member 219. In one embodiment, the second cross member 231 is substantially perpendicular to the first plane and the second plane. Further, in one embodiment, a third cross member 241 may connect a second end 243 of the second vertical member 217 with a second end 245 of the fourth vertical member 223. Preferably, the third cross member 241 is substantially perpendicular to the first plane and the second plane. Additionally, the second cross member 231, the first vertical member 213 and the third vertical member 219 may all reside in a third plane, and the third cross member 241, the second vertical member 217 and the fourth vertical member 223 may all reside in a fourth plane substantially parallel to the third plane.

In an alternate embodiment, the frame 211 of the cargo case 210 may comprise a plurality of frame members, e.g., frame members 213 and 217, in a first plane, a plurality of frame members, e.g. 219 and 223, in a second plane, where the second plane is substantially parallel to the first plane, and a plurality of cross members, e.g., 231 and 241, connecting the plurality of frame members in the first plane with the plurality of frame members in the second plane.

Additionally, the frame 211 may also have receivers or connectors to removably secure the cargo case 210 to the wagon 214. In one embodiment, as shown in FIGS. 11-15, a first receiver 251 adjacent a first end 253 of the first vertical member 213 for releasably engaging one of the plurality of hangars 255 of the wagon 214 to assist in securing the cargo case 210 to the wagon 214 in a cargo use position. And, in a preferred embodiment, the frame 211 may also have a second receiver 257 adjacent a first end 261 of the second vertical member 217 for releasably engaging another of the plurality of hangars 255 of the wagon 214 to assist in securing the cargo case 210 to the wagon 214 in a cargo use position. Further, in a preferred embodiment the receivers 251, 257 are provided in the first plane. In a preferred embodiment, the first receiver 251 and the second receiver 257 have openings 263 extending through the respective receivers 251, 257, to receive and releasably engage, respectively, one of the plurality of hangers 255 extending from the wagon 214. Accordingly, because the frame 211 is generally associated with the housing 212, the sidewalls of the housing 212 will preferably similarly have openings to allow the receivers 251, 257 to receive the hangers 255 of the wagon 214 to secure the cargo case 210 to the wagon 214. As shown in FIG. 10, in a preferred embodiment the cargo case 210 is positioned adjacent a rear of the wagon 214 in a cargo use configuration.

As shown in FIGS. 13 and 16-18, the housing 212 of the cargo case 210 may comprise a first side wall 220, an opposing second side wall 222, a third side wall 224 extending between and preferably connecting the first side wall 220 and the second side wall 222, and a fourth side wall 226 that opposes the third side wall 224 and which extends between and preferably connects the first side wall 220 and the second side wall 222. The housing 212 may also comprise a bottom wall 228 that connects the first side wall 220, second side wall 222, third side wall 224 and fourth side wall 226. The first side wall 220, second side wall 222, third side wall 224, fourth side wall 226 and bottom wall 228 defining a cavity 216 of the housing 212. In the storage configuration, shown in FIGS. 19-21, the wagon 214 is positioned within the cavity 216 of the housing 212.

Figure 13A:
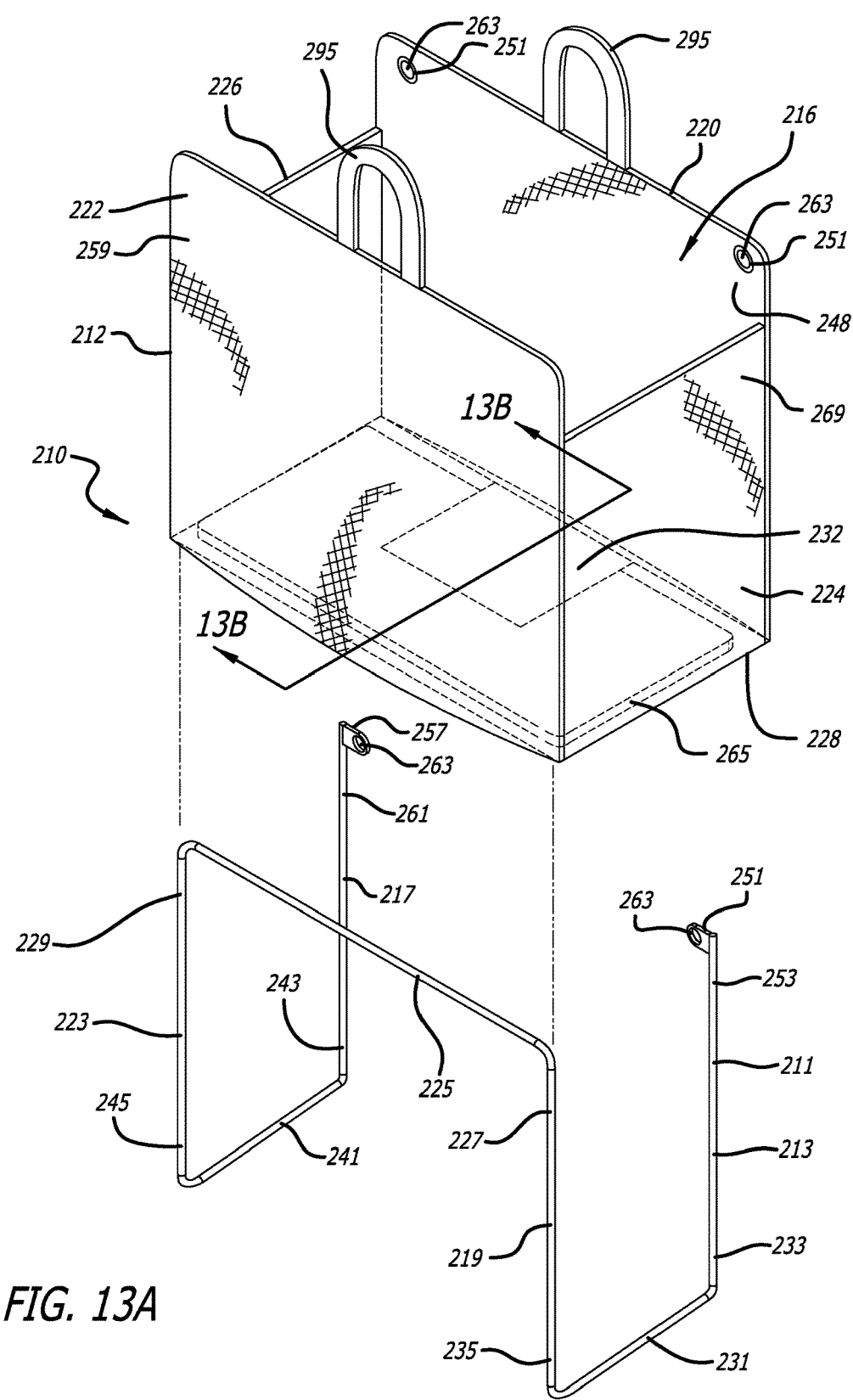
FIG. 13A is an exploded front perspective view of one embodiment of the convertible cargo case.
Figure 13B:
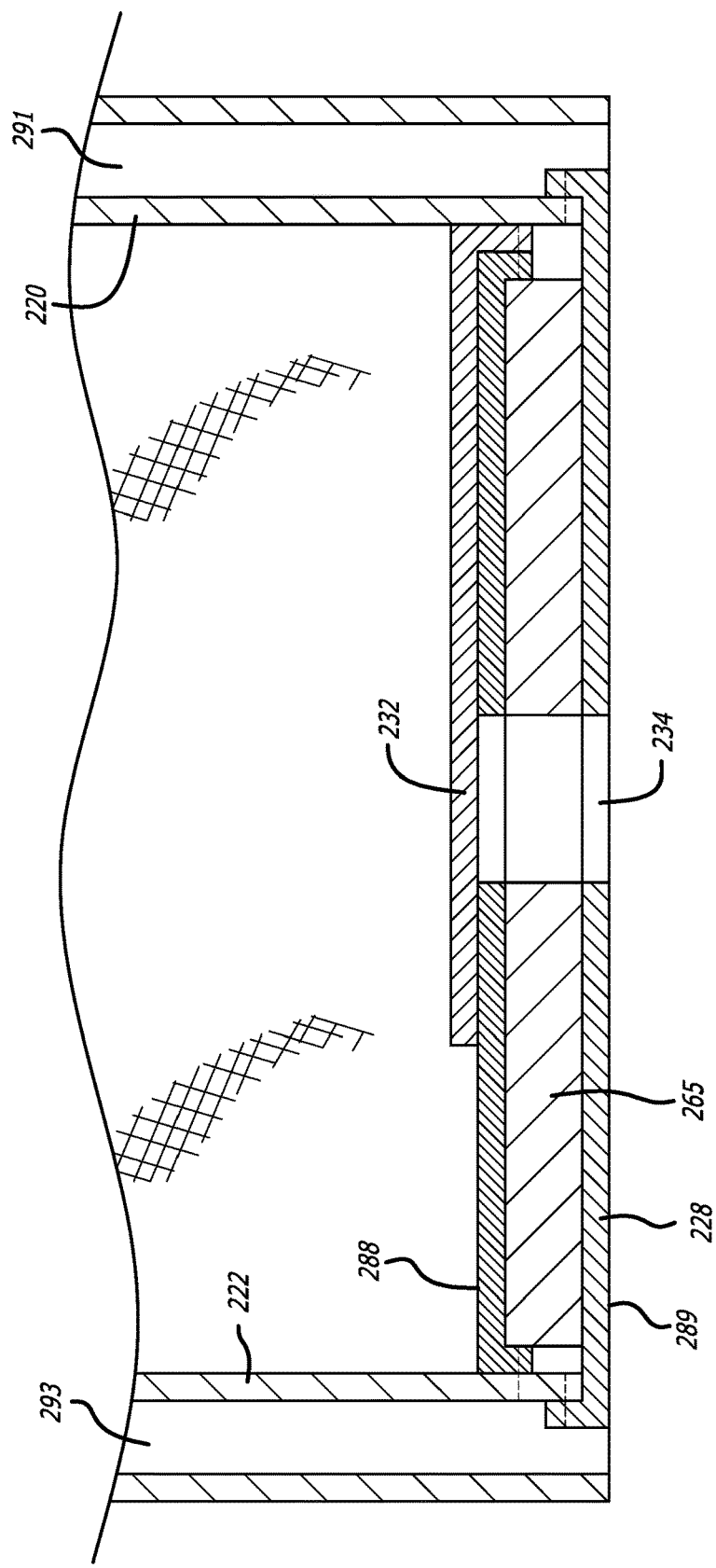
FIG. 13B is a partial cross sectional side view of the convertible cargo case about line 13B-13B in FIG. 13A.
Figure 14:
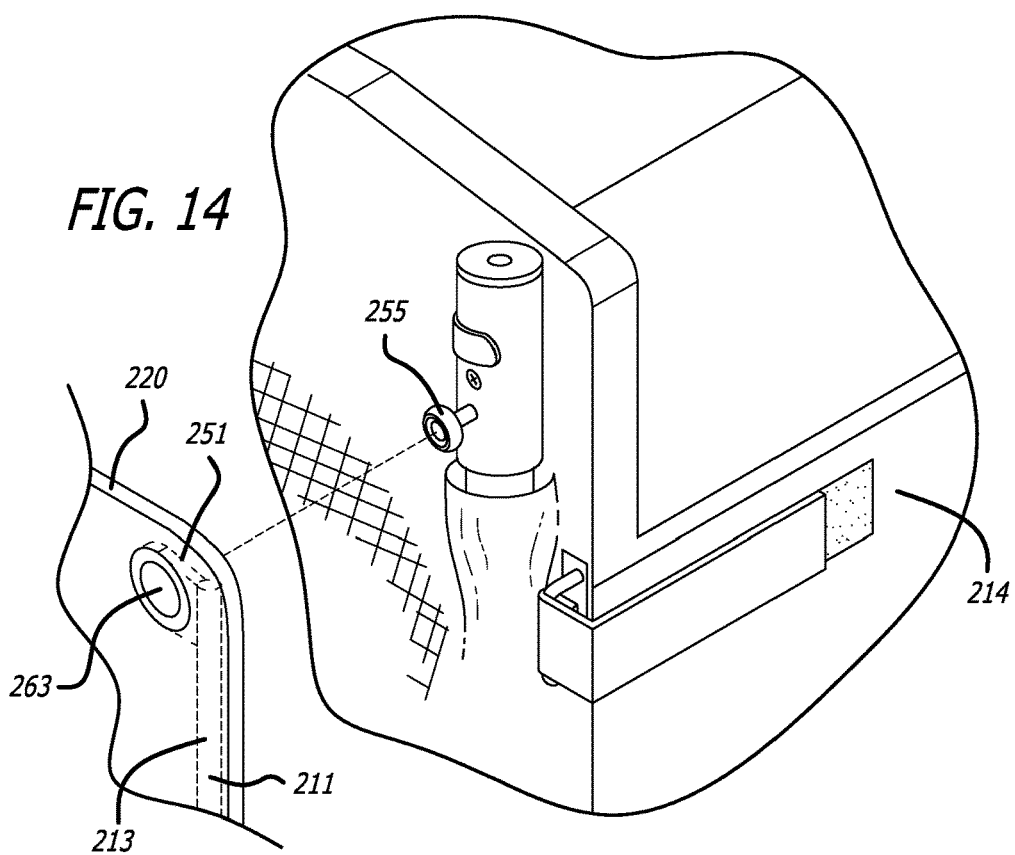
FIG. 14 is a partial front perspective view showing one embodiment of a connection for a convertible cargo case with a wagon.
Figure 15:
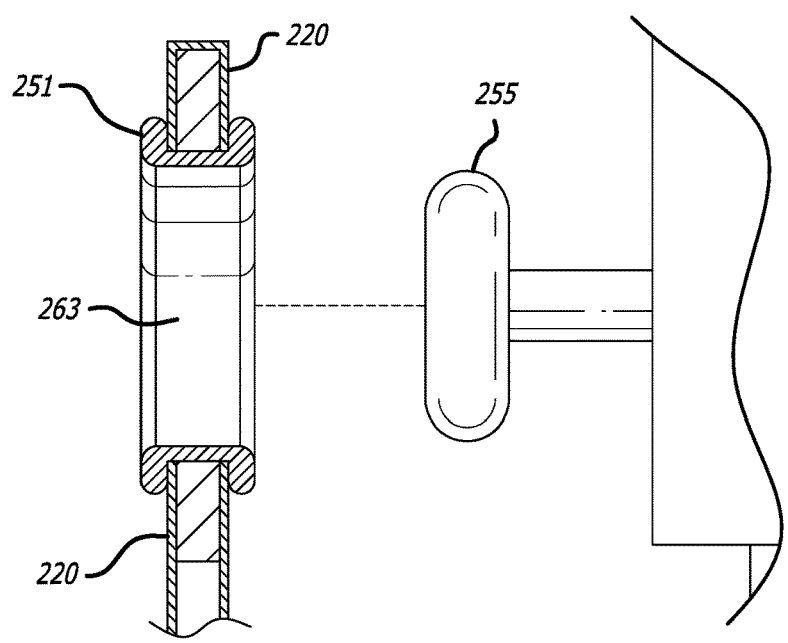
FIG. 15 is a partial cross-sectional side view of the convertible cargo case showing one embodiment of a connection for the convertible cargo case with the wagon.

In one embodiment, as shown in FIGS. 13A-13B, a rigid member 265 is provided at the bottom wall 228 of the housing 212. In one embodiment the rigid member 265 is a rigid planar member that is sewn into the bottom wall 228 of the housing 212.

Figure 16:
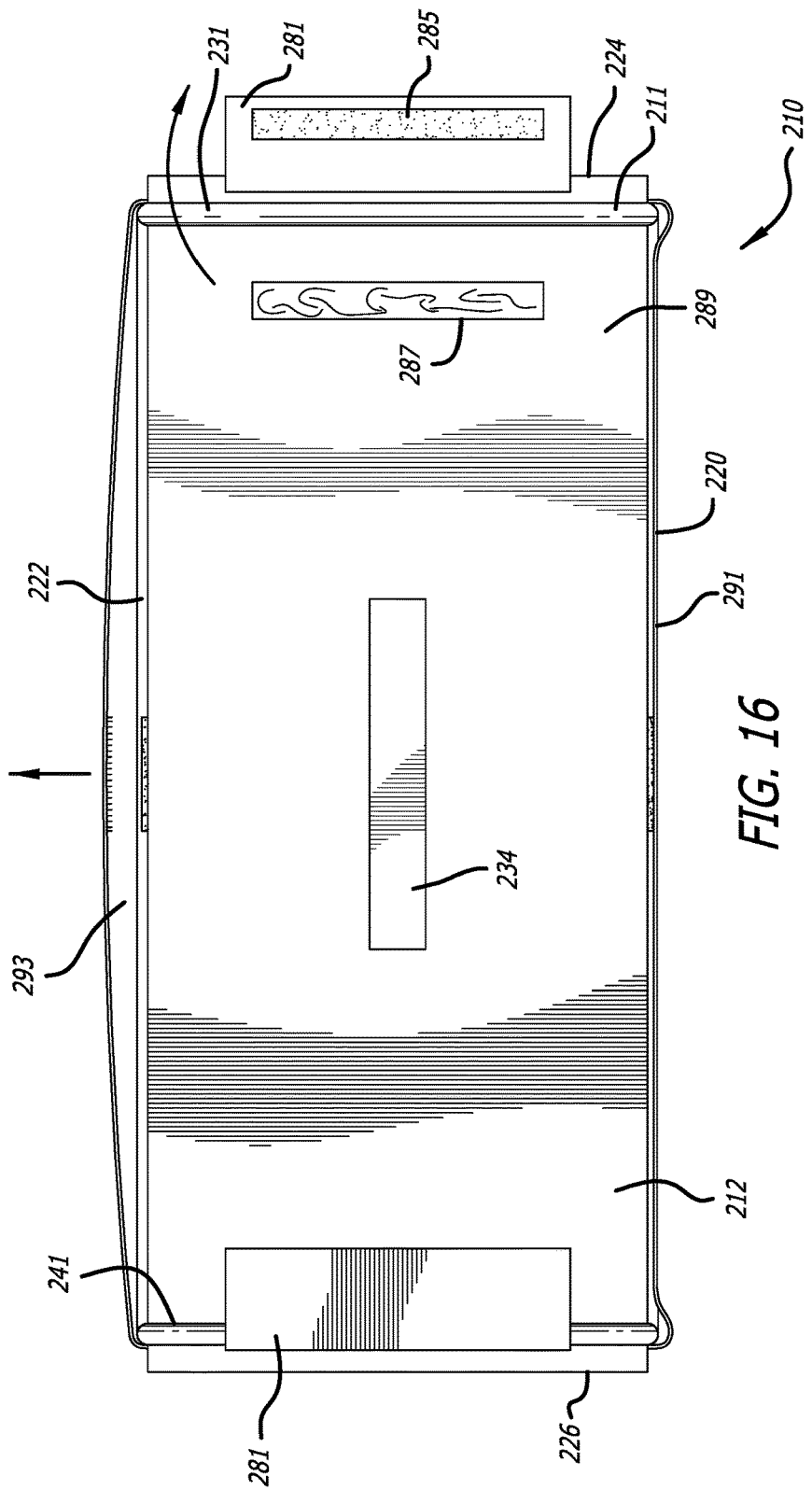
FIG. 16 is a bottom view of the convertible cargo case of FIG. 10.

Referring to FIGS. 13, 16 and 18, the bottom wall 228 may have an aperture 234 that extends through the bottom wall 228 from the interior surface 288 thereof to the exterior surface 289 thereof, as well as through the rigid member 265 (see FIG. 13B). The aperture 234 is provided to allow a handle or hand grip 102 of the wagon 214 to extend through the housing 212 for carrying the cargo case 210 and wagon 214 together as shown in FIGS. 20 and 21 in the storage configuration. In one embodiment the hand grip 102 extends from a bottom wall of the wagon 214.

Figure 17:
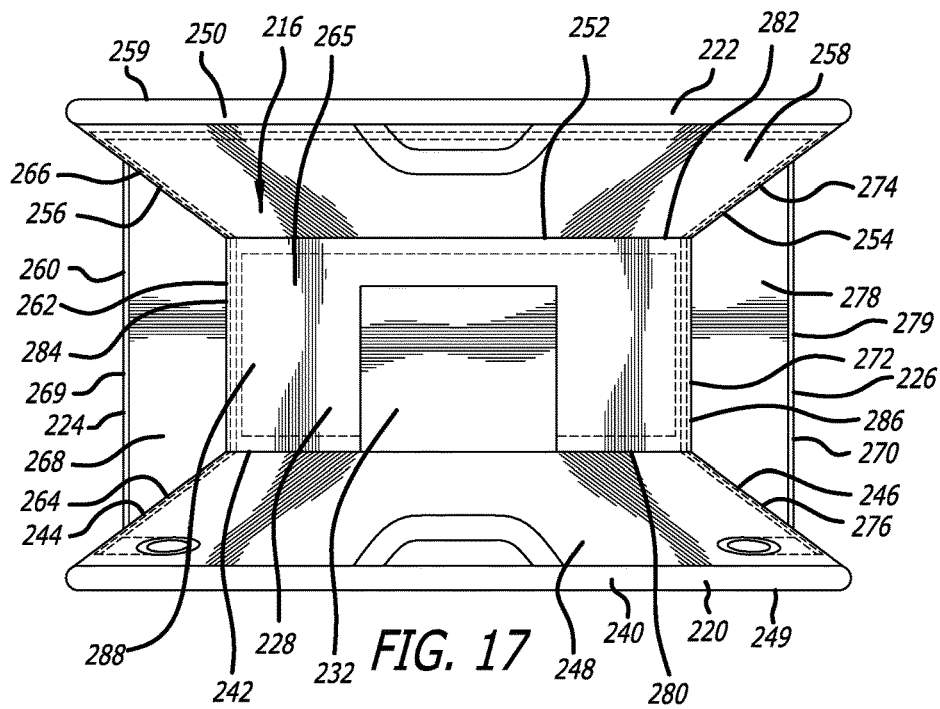
FIG. 17 is a top view of the convertible cargo case of FIG. 10 with a bottom member is a cargo use position.

The cargo case 210 may also comprise a bottom member 232, as shown in FIGS. 13B, 17 and 18, that operates to both cover an opening 234 in the bottom wall 228, and which, in certain embodiments, operates as a rigid pivotable member for the housing 212 of the cargo case 210. In one embodiment the bottom member 232 extends from the joint between the first side wall 220 and the bottom wall 228 to selectively cover the opening 234 in the bottom wall 228 as well as in the rigid member 265 to allow a handgrip 102 of the wagon 214 to pass through as shown in FIGS. 19-21.

Additionally, in one embodiment, the cargo case 210 may have first securing member 236 to secure a handle 237 of the wagon 214 to the cargo case 210 in the case storage position as shown in FIG. 20.

Referring to FIGS. 10, 11 and 17-21, in one embodiment the first side wall 220 has a first or top end 240, a second or bottom end 242, a first side edge 244, a second side edge 246, an interior surface 248 and an exterior surface 249. Similarly, the second side wall 222 has a first or top end 250, a second or bottom end 252, a first side edge 254, a second side edge 256, an interior surface 258 and an exterior surface 259. The third side wall 224 has a first or top end 260, a second or bottom end 262, a first side edge 264, a second side edge 266, an interior surface 268 and an exterior surface 269. The fourth side wall 226 has a first or top end 270, a second or bottom end 272, a first side edge 274, a second side edge 276, an interior surface 278 and an exterior surface 279. Finally, the bottom wall 228 has a first edge 280, a second edge 282, a third edge 284, a fourth edge 286, an interior surface 288 and an exterior surface 289. In one embodiment the interior surfaces of the first side wall 220, second side wall 222, third side wall 224, fourth side wall 226 and bottom wall 228 define the cavity 216 of the housing 212.

In a preferred embodiment, the housing 212 also has a plurality of pockets to receive the frame 211. In one embodiment, the housing 212 has a first pocket 291 and a second pocket 293. The first pocket 291 is adjacent the first side wall 220 of the housing 212, and preferably receives at least one of the first vertical frame member 213 and the second vertical frame member 217, and preferably both the first frame member 213 as well as the second frame member 217. The second pocket 293 is adjacent the second side wall 222, and preferably receives the first cross member 225, third vertical member 219 and fourth vertical member 223. The pockets may be used to store items in the storage configuration. For example, as shown in FIG. 20, the canopy 301 of the wagon 214 may be stored in the second pocket 293. Additionally, the pockets 291, 293 may have fasteners 303, such as mating Velcro members, to close the opening to the pockets 291, 293.

As shown in FIG. 16, in one embodiment the housing 212 has a lock 281 to releasably secure the housing 212 to the frame 211. In one embodiment, the lock 281 comprises a first lock 281 to secure the second cross member 231 to the housing 212 and a second lock 281 to secure the third cross member 241 to the housing 212. Referring to FIG. 16, in one embodiment the lock 281 comprises a flap 283 having a first securing member 285 that connects to a second securing member 287 on the exterior surface 289 of the bottom wall 228. In one embodiment the first and second securing members 285, 287 are mating Velcro members.

The housing 212 may also have handles 295 extending from the sidewalls to allow the cargo case 210 to be carried when removed from the wagon 214. In one embodiment, as shown in FIGS. 11, 17 and 18, first and second handles 295 extend from, respectively, the first side wall 220 and the second side wall 222 of the housing 212.

In one embodiment, the construction of the housing 212 of the cargo case 210 is as follows. The first side edge 264 of the third side wall 224 is connected to the first side edge 244 of the first side wall 220; the second side edge 266 of the third side wall 224 is connected to the second side edge 256 of the second side wall 222; and the bottom end 262 of the third side wall 224 is connected to the third edge 284 of the bottom wall 228. The first side edge 274 of the fourth side wall 226 is connected to the first side edge 254 of the second side wall 222; the second side edge 276 of the fourth side wall 226 is connected to the second side edge 246 of the first side wall 220; and the bottom end 272 of the fourth side wall 226 is connected to the fourth edge 286 of the bottom wall 228. Finally, the bottom end 242 of the first side wall 220 is connected to the first edge 280 of the bottom wall 228, and the bottom end 252 of the second side wall 222 is connected to the second edge 282 of the bottom wall 228. Accordingly, as explained above, in this configuration the interior surfaces 248, 258, 268, 278 and 288 of the first side wall 220, second side wall 222, third side wall 224, fourth side wall 226 and bottom wall 228, respectively, define the interior cavity 216 of the housing 212. Additionally, the pockets 291, 293 and locks 281 are added to the housing 212.

Accordingly, the cargo case 210 is useable in a cargo carrying mode as shown in FIG. 102, with cargo able to be retained in the cavity 216 of the housing 212. When the user desires to fold the wagon 214 or other ride-on for transportation or storage, the cargo case 210 may be converted into a case in the case or storage mode. To place the cargo case 210 in the case mode, the housing 212 is removed from the wagon 214 and placed on top of the folded wagon 214 as shown in FIG. 19, and the folded wagon 214 is partially placed into the cavity 216 of the housing 212 as shown in FIGS. 20 and 21. Additionally, if it is desired to have a handle 102 of the wagon 214 extend through the aperture 234 in the bottom wall 228 of the housing 212 for carrying the wagon 214 and cargo case 210 together, it is preferred that the bottom member 232 within the cavity 216 of the housing 212 be moved and/or secured to the interior surface 258 of the second side wall 222 prior to placing the wagon 214 in the cavity 216 of the housing 212 as shown in FIG. 18.

Several alternative embodiments and examples have been described and illustrated herein. A person of ordinary skill in the art would appreciate the features of the individual embodiments, and the possible combinations and variations of the components. A person of ordinary skill in the art would further appreciate that any of the embodiments could be provided in any combination with the other embodiments disclosed herein. Additionally, the terms "first," "second," "third," and "fourth" as used herein are intended for illustrative purposes only and do not limit the embodiments in any way. Further, the term "plurality" as used herein indicates any number greater than one, either disjunctively or conjunctively, as necessary, up to an infinite number. Additionally, the term "having" as used herein in both the disclosure and claims, is utilized in an open-ended manner.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein. Accordingly, while the specific embodiments have been illustrated and described, numerous modifications come to mind without significantly departing from the spirit of the invention and the scope of protection is only limited by the scope of the accompanying Claims.

What is claimed is:

1. A convertible cargo case for a wagon having a plurality of hangers extending therefrom, comprising:
    a frame having a first vertical member in a first plane, a second vertical member in the first plane and spaced a distance from the first vertical member, a third vertical member in a second plane different from the first plane, a fourth vertical member in the second plane and spaced a distance from the third vertical member, a first cross member connecting a first end of the third vertical member with a first end of the fourth vertical member, the first cross member being in the second plane, a second cross member connecting a second end of the first vertical member with a second end of the third vertical member, the second cross member being substantially perpendicular to the first plane and the second plane, and a third cross member connecting a second end of the second vertical member with a second end of the fourth vertical member, the third cross member being substantially perpendicular to the first plane and the second plane;
    a first receiver adjacent a first end of the first vertical member for releasably engaging one of the plurality of hangers of the wagon to assist in securing the cargo case to the wagon in a cargo use position;
    a second receiver adjacent a first end of the second vertical member for releasably engaging another of the plurality of hangers of the wagon to assist in securing the cargo case to the wagon in a cargo use position; and,
    a housing having a first side wall, a second side wall opposing the first side wall, a third side wall joining one end of the first side wall and one end of the second side wall, a fourth side wall opposing the third side wall and joining an opposing end of the first side wall and an opposing end of the second side wall, and a bottom wall joining a bottom end of the first side wall, second side wall, third side wall and fourth side wall to define a cavity of the housing, the housing having a rigid member at the bottom wall, and the bottom wall and the rigid member each having an opening to allow a hand grip of the wagon to pass therethrough; and,
    a lock to releasably secure the housing to the frame.

2. The convertible cargo case of claim 1, further comprising a rigid pivotable bottom member to selectively cover the opening in the bottom wall and in the rigid member.

3. The convertible cargo case of claim 1, wherein the first side wall of the housing has a first pocket to receive at least one of the first vertical member and the second vertical member.

4. The convertible cargo case of claim 1, wherein the second side wall of the housing has a second pocket to receive the first cross member, third vertical member and fourth vertical member.

5. The convertible cargo case of claim 1, further comprising a first handle connected to the first side wall and a second handle connected to the second side wall.

6. The convertible cargo case of claim 1, wherein the lock comprises a first lock to secure the second cross member to the housing and a second lock to secure the third cross member to the housing.

7. The convertible cargo case of claim 1, wherein the convertible cargo case is positioned adjacent a rear of the wagon in a cargo use configuration, and wherein the wagon is positioned partially within the cavity of the housing in a storage configuration.

8. The convertible cargo case of claim 1, wherein the first receiver and second receiver have openings to each receive one of the plurality of hangers extending from the wagon.

9. The convertible cargo case of claim 1, further comprising a securing member on the first side wall of the housing to retain a handle of the wagon in a storage configuration.

10. A convertible cargo case for a wagon having at least one hanger extending therefrom, comprising:
    a frame having a plurality of frame members in a first plane, a plurality of frame members in a second plane, the second plane being substantially parallel to the first plane, and a plurality of cross members connecting the plurality of frame members in the first plane with the plurality of frame members in the second plane;
    a receiver extending from one of the plurality of frame members in the first plane for releasably engaging the at least one hanger of the wagon; and,
    a housing having a first side wall, a second side wall opposing the first side wall, a third side wall joining one end of the first side wall and one end of the second side wall, a fourth side wall opposing the third side wall and joining an opposing end of the first side wall and an opposing end of the second side wall, and a bottom wall joining a bottom end of the first side wall, second side wall, third side wall and fourth side wall to define a cavity of the housing, wherein the first side wall of the housing has a first pocket to receive at least one of the plurality of frame members in the first plane, wherein the second side wall of the housing has a second pocket to receive at least one of the plurality of frame members in the second plane, wherein the housing is releasably secured to the frame of the convertible cargo case, wherein the convertible cargo case is positioned adjacent a rear of the wagon in a cargo use configuration, and wherein the wagon is positioned partially within the cavity of the housing in a storage configuration.

11. The convertible cargo case of claim 10, wherein the plurality of frame members in the first plane comprise a first vertical member and a second vertical member spaced a distance from the first vertical member, wherein the plurality of frame members in the second plane comprise a third vertical member, a fourth vertical member spaced a distance from the third vertical member, and a first cross member connecting a first end of the third vertical member with a first end of the fourth vertical member, wherein the plurality of a cross members connecting the plurality of frame members in the first plane with the plurality of frame members in the second plane comprises a second cross member connecting a second end of the first vertical member with a second end of the third vertical member and a third cross member connecting a second end of the second vertical member with a second end of the fourth vertical member.

12. The convertible cargo case of claim 11, wherein the second cross member is substantially perpendicular to the first plane and the second plane, and wherein the third cross member is substantially perpendicular to the first plane and the second plane.

13. The convertible cargo case of claim 10, wherein the housing has a rigid member connected to the bottom wall, and the bottom wall and the rigid member each having an opening to allow a hand grip of the wagon to pass therethrough.

14. The convertible cargo case of claim 13, further comprising a rigid pivotable bottom member to selectively cover the opening in the bottom wall.

15. The convertible cargo case of claim 10, wherein the housing has openings to allow the plurality of hangers extending from the wagon to extend therethrough.

16. The convertible cargo case of claim 10, wherein the receiver of the frame comprises a first receiver extending from one of the plurality of frame members in the first plane for releasably engaging a first of the at least one of the hangers of the wagon, and a second receiver extending from another one of the plurality of frame members in the first plane for releasably engaging a second of the at least one of the of hangers of the wagon.

17. The convertible cargo case of claim 10, further comprising a lock to releasably secure the housing to the frame.

18. A convertible cargo case for a wagon having a plurality of hangers extending therefrom, comprising:
a frame having a plurality of frame members in a first plane, a plurality of frame members in a second plane, the second plane being substantially parallel to the first plane, and a plurality of cross members connecting the plurality of frame members in the first plane with the plurality of frame members in the second plane; and,
a housing having a first side wall, a second side wall opposing the first side wall, a third side wall joining one end of the first side wall and one end of the second side wall, a fourth side wall opposing the third side wall and joining an opposing end of the first side wall and an opposing end of the second side wall, and a bottom wall joining a bottom end of the first side wall, second side wall, third side wall and fourth side wall to define a cavity of the housing, wherein the first side wall of the housing has a first pocket to receive at least one of the plurality of frame members in the first plane, wherein the second side wall of the housing has a second pocket to receive at least one of the plurality of frame members in the second plane, wherein the housing is releasably secured to the frame of the convertible cargo case with a plurality of locks, wherein the housing has a rigid member at the bottom wall, and the bottom wall and the rigid member each have an opening to allow a hand grip of the wagon to pass therethrough, wherein the convertible cargo case is positioned adjacent a rear of the wagon in a cargo use configuration, and wherein the wagon is positioned partially within the cavity of the housing in a storage configuration.

19. The convertible cargo case of claim 18, further comprising a first receiver extending from one of the plurality of frame members in the first plane for releasably engaging one of the plurality of hangers of the wagon, and a second receiver extending from another one of the plurality of frame members in the first plane for releasably engaging another of the plurality of hangers of the wagon.

20. The convertible cargo case of claim 18, further comprising a rigid pivotable bottom member to selectively cover the opening in the bottom wall and in the rigid member.

* * * * *